United States Patent
Wu et al.

(10) Patent No.: US 12,327,330 B2
(45) Date of Patent: Jun. 10, 2025

(54) DISPLAY DEVICE SYSTEM AND METHOD FOR ADAPTIVELY ENHANCING IMAGE QUALITY

(71) Applicant: BOE Technology Group Co., Ltd., Beijing (CN)

(72) Inventors: Yanhong Wu, Beijing (CN); Guannan Chen, Beijing (CN); Dan Zhu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/794,837

(22) PCT Filed: Sep. 23, 2021

(86) PCT No.: PCT/CN2021/119834
§ 371 (c)(1),
(2) Date: Jul. 22, 2022

(87) PCT Pub. No.: WO2023/044653
PCT Pub. Date: Mar. 30, 2023

(65) Prior Publication Data
US 2024/0193734 A1  Jun. 13, 2024

(51) Int. Cl.
*G06T 5/20* (2006.01)
*G06T 3/4053* (2024.01)
(Continued)

(52) U.S. Cl.
CPC .............. *G06T 5/20* (2013.01); *G06T 3/4053* (2013.01); *G06T 7/0002* (2013.01);
(Continued)

(58) Field of Classification Search
CPC ....... G06T 5/20; G06T 3/4053; G06T 7/0002; G06T 11/001; G06T 2207/10024;
(Continued)

(56) References Cited

U.S. PATENT DOCUMENTS

| | | | |
|---|---|---|---|
| 2012/0213451 A1* | 8/2012 | Ma | G06T 5/50 382/260 |
| 2016/0217556 A1* | 7/2016 | Agaian | G06T 5/73 |

(Continued)

FOREIGN PATENT DOCUMENTS

| | | |
|---|---|---|
| CN | 102156966 A | 8/2011 |
| CN | 102646265 A | 8/2012 |

(Continued)

*Primary Examiner* — Wesley J Tucker
(74) *Attorney, Agent, or Firm* — IPro, PLLC

(57) ABSTRACT

Disclosed are a display device system and a method for adaptively enhancing an image quality. The method includes: acquiring an original image, performing iterative detail enhancement processing on the original image by utilizing at least one filter function containing iteratively-updated filter parameters, in a case that a difference between a quality evaluation score of the input image and a quality evaluation score of the detail-enhanced image of the $i^{th}$ iteration satisfies an iteration condition, obtaining filter parameters of an $(i+1)^{th}$ iteration by updating the filter parameters of the $i^{th}$ iteration, and continuing to perform detail enhancement processing on the input image by utilizing at least one filter function containing the filter parameters of the $(i+1)^{th}$ iteration, until a difference between the quality evaluation score of the input image and a quality evaluation score of a detail-enhanced image of the $(i+1)^{th}$ iteration satisfies the iteration condition.

18 Claims, 8 Drawing Sheets

(51) Int. Cl.
    *G06T 7/00*           (2017.01)
    *G06T 11/00*         (2006.01)

(52) U.S. Cl.
    CPC .. G06T 11/001 (2013.01); *G06T 2207/10024* (2013.01); *G06T 2207/20004* (2013.01); *G06T 2207/30168* (2013.01); *G06T 2210/32* (2013.01)

(58) Field of Classification Search
    CPC . G06T 2207/20004; G06T 2207/30168; G06T 2210/32
    See application file for complete search history.

(56) References Cited

U.S. PATENT DOCUMENTS

| | | | |
|---|---|---|---|
| 2017/0069063 A1* | 3/2017 | Yim | G06T 5/70 |
| 2019/0197674 A1 | 6/2019 | Bai et al. | |
| 2020/0036889 A1* | 1/2020 | Udayakumar | H04N 23/635 |
| 2023/0319218 A1* | 10/2023 | Ren | H04N 5/2624 |
| | | | 382/284 |
| 2024/0064318 A1* | 2/2024 | Letunovskiy | H04N 19/42 |
| 2024/0340530 A1* | 10/2024 | Amini | G06T 7/0002 |

FOREIGN PATENT DOCUMENTS

| | | |
|---|---|---|
| CN | 109844815 A | 6/2019 |
| WO | 2007141368 A1 | 12/2007 |

\* cited by examiner

DISPLAY DEVICE SYSTEM AND METHOD FOR ADAPTIVELY ENHANCING IMAGE QUALITY

CROSS REFERENCE TO RELATED APPLICATIONS

The present disclosure is a US National Stage of International Application No. PCT/CN2021/119834, filed on Sep. 23, 2021, the entire contents of which are incorporated herein by reference.

FIELD

The present disclosure relates to the field of image processing, and in particular to a display device system and a method for adaptively enhancing an image quality.

BACKGROUND

Theoretically, the contrast, saturation, color, etc, of the image picture are adjusted to enhance the image quality to a certain extent and to further improve the definition of the image quality visually. Currently, the image quality enhancement solution applied to the display devices is in need of continuous adjustment of parameters according to different image types and image contents. When the image quality enhancement solution is employed, the image quality of the input image is enhanced with the adjusted parameters.

In the current image quality enhancement solution, the parameters used for enhancing the image quality of any input image are fixed. However, owing to the differences in contrast, saturation, color, etc, between different images, if the image qualities of different images are enhanced with the same set of parameters, it is highly possible to lead to inferior image quality enhancement, and it is impossible to adaptively adjust the parameters and enhance the image qualities for different input images.

SUMMARY

The present disclosure provides a display device system and a method for adaptively enhancing an image quality, which are used for adaptively enhancing, according to edge features and high-frequency information of different input images, an image quality, thereby enhancing image qualities of different images to the maximum extent.

In a first aspect, a display device provided in an embodiment of the present disclosure includes: a memory storing computer-readable instructions; and a processor configured to run the computer-readable instructions to execute: acquiring an original image, and performing iterative detail enhancement processing on the original image by utilizing at least one filter function comprising iteratively-updated filter parameters, which specifically comprises: for an input image on which the detail enhancement processing is to be performed, extracting feature information of an $i^{th}$ iteration from the input image by utilizing at least one filter function comprising filter parameters subjected to an $i^{th}$ iterative update, and obtaining a detail-enhanced image of the $i^{th}$ iteration by performing the detail enhancement processing of the $i^{th}$ iteration on the input image based on the feature information of the $i^{th}$ iteration, wherein the input image comprises an image associated with the original image, and i is an integer greater than or equal to 1; and in a case that a difference between a quality evaluation score of the input image and a quality evaluation score of the detail-enhanced image of the $i^{th}$ iteration satisfies an iteration condition, obtaining filter parameters of an $(i+1)^{th}$ iteration by updating the filter parameters of the $i^{th}$ iteration, and continuing to perform the detail enhancement processing on the input image by utilizing at least one filter function comprising the filter parameters of the $(i+1)^{th}$ iteration, until a difference between the quality evaluation score of the input image and a quality evaluation score of a detail-enhanced image of the $(i+1)^{th}$ iteration satisfies the iteration condition: wherein the display device system further comprises a display screen configured for displaying a detail-enhanced image of a last iteration.

After the acquiring the original image, and before performing the iterative detail enhancement processing on the original image by utilizing the at least one filter function comprising iteratively-updated filter parameters, the processor is further configured for: in a case that the original image is a red-green-blue (RGB) image, obtaining a hue-saturation-value (HSV) original image by performing HSV conversion on a color channel of the RGB original image; and taking a value (V) channel image of the HSV original image as the input image on which the detail enhancement processing is to be performed.

As a possible implementation, before the displaying the detail-enhanced image of the last iteration, specifically, the processor is further configured for: converting the detail-enhanced image of the last iteration into an RGB detail-enhanced image.

Specifically, the display screen is configured for: displaying the RGB detail-enhanced image.

As a possible implementation, specifically, the processor is further configured for: extracting first feature information of the $i^{th}$ iteration from the original image by utilizing a first filter function comprising first filter parameters subjected to the $i^{th}$ iterative update, and obtaining a first enhanced image of the $i^{th}$ iteration by performing the detail enhancement processing of the $i^{th}$ iteration on the original image based on the first feature information of the $i^{th}$ iteration; and extracting second feature information of the $i^{th}$ iteration from the first enhanced image by utilizing a second filter function comprising second filter parameters subjected to the $i^{th}$ iterative update, and obtaining the detail-enhanced image of the $i^{th}$ iteration by performing the detail enhancement processing of the $i^{th}$ iteration on the first enhanced image based on the second feature information of the $i^{th}$ iteration.

As a possible implementation, specifically, the processor is further configured for: obtaining the first enhanced image of the $i^{th}$ iteration by superimposing the first feature information of the $i^{th}$ iteration on the original image; and obtaining the detail-enhanced image of the $i^{th}$ iteration by superposing the second feature information of the $i^{th}$ iteration on the first enhanced image of the $i^{th}$ iteration.

As a possible implementation, specifically, a processor is further configured for: obtaining a first filtered image of the $i^{th}$ iteration by filtering the original image by utilizing the first filter function comprising the first filter parameters subjected to the $i^{th}$ iterative update, and obtaining the first feature information of the $i^{th}$ iteration by subtracting the first filtered image of the $i^{th}$ iteration from the original image; and obtaining a second filtered image of the $i^{th}$ iteration by filtering the first enhanced image of the $i^{th}$ iteration by utilizing the second filter function comprising second filter parameters subjected to the $i^{th}$ iterative update, and obtaining the second feature information of the $i^{th}$ iteration by subtracting the second filtered image of the $i^{th}$ iteration from the first enhanced image of the $i^{th}$ iteration.

As a possible implementation, the first filter function is a guided filter function, and the second filter function is a Gaussian filter function; and alternatively, the first filter function is a Gaussian filter function, and the second filter function is a guided filter function.

As a possible implementation, a quality evaluation score of the original image is a first natural image quality evaluator (NIQE) score obtained by evaluating, based on a natural image quality evaluator (NIQE) algorithm, a quality of the original image; and a quality evaluation score of the detail-enhanced image of the $i^{th}$ iteration is a second NIQE score obtained by evaluating, based on the NIQE algorithm, a quality of the detail-enhanced image of the $i^{th}$ iteration.

As a possible implementation, specifically, the processor is further configured for: determining that a difference between the first NIQE score and the second NIQE score is less than or equal to 0), or greater than or equal to a preset threshold.

As a possible implementation, after the acquiring the original image, and before performing the iterative detail enhancement processing on the original image by utilizing the at least one filter function containing iteratively-updated filter parameters, specifically, the processor is further configured for: obtaining a reconstructed image by reconstructing a resolution of the input image subjected to super-resolution processing to a preset resolution based on a super-resolution algorithm, wherein the preset resolution is greater than a resolution of the original image, the input image subjected to the super-resolution processing is the original image or a contrast-enhanced image, and the contrast-enhanced image is obtained by performing contrast enhancement processing on the original image; and taking the reconstructed image as the input image on which the detail enhancement processing is to be performed.

As a possible implementation, specifically, the processor is further configured for: determining a super-resolution rate factor corresponding to a size of the original image according to the size of the original image; and reconstructing the resolution of the original image to the preset resolution according to the super-resolution rate factor and the super-resolution algorithm.

As a possible implementation, after the acquiring an original image, and before performing the iterative detail enhancement processing on the original image by utilizing the at least one filter function containing iteratively-updated filter parameters, specifically, the processor is further configured for: taking a reconstructed image subjected to super-resolution processing or the original image not subjected to super-resolution processing as an input image, and performing iterative contrast enhancement processing by utilizing an iteratively-updated gamma value: obtaining a contrast-enhanced image of a $j^{th}$ iteration by performing gamma transformation on the input image on which the contrast enhancement processing is to be performed according to a gamma value subjected to a $j^{th}$ iterative update, wherein j is an integer greater than or equal to 1: in a case that a contrast difference between a contrast of the contrast-enhanced image of the $j^{th}$ iteration and a contrast of the input image on which the contrast enhancement processing is to be performed is greater than a contrast threshold, replacing the contrast of the input image on which the contrast enhancement processing is to be performed with the contrast of the contrast-enhanced image of the $j^{th}$ iteration, obtaining a gamma value of a $(j+1)^{th}$ iteration by updating the gamma value of the $j^{th}$ iteration, and continuing to perform the iterative contrast enhancement processing on the input image on which the contrast enhancement processing is to be performed by utilizing the gamma value of the $(j+1)^{th}$ iteration, until the contrast difference between the contrast of the contrast-enhanced image of the $j^{th}$ iteration and the contrast of the input image on which the contrast enhancement processing is to be performed is less than or equal to the contrast threshold; and taking a contrast-enhanced image of a last iteration as the input image on which the detail enhancement processing is to be performed.

As a possible implementation, before the taking the contrast-enhanced image of the last iteration as the input image on which the detail enhancement processing is to be performed, specifically, the processor is further configured for: determining a difference between a brightness mean of the input image on which the contrast enhancement processing is to be performed and a brightness mean of the contrast-enhanced image of the last iteration; obtaining a superimposed image by superposing the difference on brightness of the contrast-enhanced image of the last iteration; and taking the superimposed image as the input image on which the detail enhancement processing is to be performed.

As a possible implementation, before the performing the iterative contrast enhancement processing by utilizing the iteratively-updated gamma value, specifically, the processor is further configured for: in a case that the reconstructed image subjected to the super-resolution processing is an RGB image, obtaining an HSV original image by performing HSV conversion on the reconstructed image, and taking a V channel image of the HSV original image as the input image on which the contrast enhancement processing is to be performed; and or in a case that the original image not subjected to the super-resolution processing is an RGB image, obtaining an HSV original image by performing HSV conversion on the original image, and taking a V channel image of the HSV original image as the input image on which the contrast enhancement processing is to be performed.

As a possible implementation, before the using the superimposed image as the input image on which the detail enhancement processing is to be performed, specifically, the processor is further configured for: converting the superimposed image into an RGB superimposed image.

In a second aspect, a method for adaptively enhancing an image quality provided in an embodiment of the present disclosure includes: acquiring an original image, and performing iterative detail enhancement processing on the original image by utilizing at least one filter function comprising iteratively-updated filter parameters, which specifically comprises: for an input image on which the detail enhancement processing is to be performed, extracting feature information of an $i^{th}$ iteration from the input image by utilizing at least one filter function comprising filter parameters subjected to an $i^{th}$ iterative update, and obtaining a detail-enhanced image of the $i^{th}$ iteration by performing the detail enhancement processing of the $i^{th}$ iteration on the input image based on the feature information of the $i^{th}$ iteration, wherein the input image comprises an image associated with the original image, and i is an integer greater than or equal to 1; in a case that a difference between a quality evaluation score of the input image and a quality evaluation score of the detail-enhanced image of the $i^{th}$ iteration satisfies an iteration condition, obtaining filter parameters of an $(i+1)^{th}$ iteration by updating the filter parameters of the $i^{th}$ iteration, and continuing to perform detail enhancement processing on the input image by utilizing at least one filter function comprising the filter parameters of the $(i+1)^{th}$ iteration, until a difference between the quality evaluation score of the input image and a quality evaluation score of a detail-enhanced image of the $(i+1)^{th}$ iteration satisfies the iteration condition; and displaying a detail-enhanced image of a last iteration.

As a possible implementation, after the acquiring the original image, and before performing iterative detail enhancement processing on the original image by utilizing at least one filter function containing iteratively-updated filter parameters, specifically, the method further includes: in a case that the original image is an RGB image, obtaining an HSV original image by performing HSV conversion on a color channel of the RGB original image; and taking a V channel image of the HSV original image as the input image on which the detail enhancement processing is to be performed.

As a possible implementation, before the displaying the detail-enhanced image of the last iteration, specifically, the method further includes: converting the detail-enhanced image of the last iteration into an RGB detail-enhanced image.

The displaying the detail-enhanced image of the last iteration specifically includes: displaying the RGB detail-enhanced image.

As a possible implementation, the extracting the feature information of the $i^{th}$ iteration from the original image by utilizing the at least one filter function containing filter parameters subjected to the $i^{th}$ iterative update, and obtaining the detail-enhanced image of the $i^{th}$ iteration by performing the detail enhancement processing of the $i^{th}$ iteration on the original image based on the feature information of the $i^{th}$ iteration, specifically includes: extracting first feature information of the $i^{th}$ iteration from the original image by utilizing a first filter function comprising first filter parameters subjected to an $i^{th}$ iterative update, and obtaining a first enhanced image of the $i^{th}$ iteration by performing the detail enhancement processing of the $i^{th}$ iteration on the original image based on the first feature information of the $i^{th}$ iteration; and extracting second feature information of the $i^{th}$ iteration from the first enhanced image by utilizing a second filter function comprising second filter parameters subjected to the $i^{th}$ iterative update, and obtaining the detail-enhanced image of the $i^{th}$ iteration by performing the detail enhancement processing of the $i^{th}$ iteration on the first enhanced image based on the second feature information of the $i^{th}$ iteration.

As a possible implementation, the obtaining a first enhanced image of the $i^{th}$ iteration by performing the detail enhancement processing of the $i^{th}$ iteration on the original image by utilizing the first feature information of the $i^{th}$ iteration, specifically includes: obtaining the first enhanced image of the $i^{th}$ iteration by superimposing the first feature information of the $i^{th}$ iteration on the original image.

The performing the detail enhancement processing of the $i^{th}$ iteration on the first enhanced image by utilizing the second feature information of the $i^{th}$ iteration, includes: obtaining the detail-enhanced image of the $i^{th}$ iteration by superposing the second feature information of the $i^{th}$ iteration on the first enhanced image of the $i^{th}$ iteration.

As a possible implementation, the extracting first feature information of the $i^{th}$ iteration from the original image by utilizing a first filter function containing first filter parameters subjected to the $i^{th}$ iterative update, includes: obtaining a first filtered image of the $i^{th}$ iteration by filtering the original image by utilizing a first filter function containing first filter parameters subjected to an $i^{th}$ iterative update, and obtaining the first feature information of the $i^{th}$ iteration by subtracting the first filtered image of the $i^{th}$ iteration from the original image.

The extracting second feature information of the $i^{th}$ iteration from the first enhanced image by utilizing a second filter function containing second filter parameters subjected to an $i^{th}$ iterative update, includes: obtaining a second filtered image of the $i^{th}$ iteration by filtering the first enhanced image of the $i^{th}$ iteration by utilizing a second filter function containing second filter parameters subjected to an $i^{th}$ iterative update, and obtaining second feature information of the $i^{th}$ iteration by subtracting the second filtered image of the $i^{th}$ iteration from the first enhanced image of the $i^{th}$ iteration.

As a possible implementation, the first filter function is a guided filter function, and the second filter function is a Gaussian filter function; and alternatively, the first filter function is a Gaussian filter function, and the second filter function is a guided filter function.

As a possible implementation, a quality evaluation score of the original image is a first NIQE score obtained by evaluating, based on a NIQE algorithm, a quality of the original image; and a quality evaluation score of the detail-enhanced image of the $i^{th}$ iteration is a second NIQE score obtained by evaluating, based on the NIQE algorithm, a quality of the detail-enhanced image of the $i^{th}$ iteration.

As a possible implementation, the determining that a difference between the quality evaluation score of the original image and the quality evaluation score of the detail-enhanced image of the $i^{th}$ iteration satisfies an iteration condition includes: determining that a difference between the first NIQE score and the second NIQE score is less than or equal to 0, or greater than or equal to a preset threshold.

As a possible implementation, after the step of acquiring an original image, and before the step of utilizing at least one filter function containing iteratively-updated filter parameters, to perform iterative detail enhancement processing on the original image, specifically, the method further includes: obtaining a reconstructed image by reconstructing a resolution of the input image subjected to super-resolution processing to a preset resolution based on a super-resolution algorithm, wherein the preset resolution is greater than a resolution of the original image, the input image subjected to the super-resolution processing is the original image or a contrast-enhanced image, and the contrast-enhanced image is obtained by performing contrast enhancement processing on the original image; and taking the reconstructed image as the input image on which the detail enhancement processing is to be performed.

As a possible implementation, the reconstructing, based on a super-resolution algorithm, a resolution of the original image to a preset resolution includes: determining, according to a size of the original image, a super-resolution rate factor corresponding to the size; and reconstructing, according to the super-resolution rate factor and the super-resolution algorithm, the resolution of the original image to the preset resolution.

As a possible implementation, after the acquiring an original image, and before performing iterative detail enhancement processing on the original image by utilizing at least one filter function containing iteratively-updated filter parameters, the method further includes: taking the reconstructed image subjected to super-resolution processing or the original image not subjected to super-resolution processing as an input image, and performing iterative contrast enhancement processing by utilizing an iteratively-updated gamma value; obtaining a contrast-enhanced image of a $j^{th}$ iteration by performing gamma transformation on the input image on which the contrast enhancement processing is to be performed according to a gamma value subjected to a $j^{th}$ iterative update, where j is an integer greater than or equal to 1: in a case that a contrast difference between a contrast of the contrast-enhanced image of the $j^{th}$ iteration and a contrast of the input image on which the contrast enhancement processing is to be performed is greater than a contrast threshold, replacing the contrast of the input image on which the contrast enhancement processing is to be performed with the contrast of the contrast-enhanced image of the $j^{th}$ iteration, obtaining a gamma value of a $(j+1)^{th}$ iteration by updating the gamma value of the $j^{th}$ iteration, and continuing to perform iterative contrast enhancement processing on the input image on which the contrast enhancement processing is to be performed by utilizing the gamma value of the $(j+1)^{th}$ iteration, until it is determined that the contrast difference between the contrast of the contrast-enhanced image of the $j^{th}$ iteration and the contrast of the input image on which the contrast enhancement processing is to be performed is less than or equal to the contrast threshold; and taking the contrast-enhanced image of the last iteration as the input image on which the detail enhancement processing is to be performed.

As a possible implementation, before the taking the contrast-enhanced image of the last iteration as the input image on which the detail enhancement processing is to be performed, the method further includes: determining a difference between a brightness mean of the input image on which the contrast enhancement processing is to be performed and a brightness mean of the contrast-enhanced image of the last iteration; obtaining a superimposed image by superposing the difference on brightness of the contrast-enhanced image of the last iteration; and taking the superimposed image as the input image on which the detail enhancement processing is to be performed.

As a possible implementation, before performing iterative contrast enhancement processing by utilizing an iteratively-updated gamma value, the method further includes: in a case that the reconstructed image subjected to super-resolution processing is an RGB image, obtaining an HSV original image by performing HSV conversion on the reconstructed image, and taking a V channel image of the HSV original image as the input image on which the contrast enhancement processing is to be performed; and alternatively, in a case that the original image not subjected to super-resolution processing is an RGB image, obtain an HSV original image by performing HSV conversion on the original image, and taking a V channel image of the HSV original image as the input image on which the contrast enhancement processing is to be performed.

As a possible implementation, before the taking the superimposed image as the input image on which the detail enhancement processing is to be performed, the method further includes: converting the superimposed image into an RGB superimposed image.

In a third aspect, an embodiment of the present disclosure provides an apparatus for adaptively enhancing an image quality, including: an enhancement processing unit used for acquiring an original image, and performing iterative detail enhancement processing on the original image by utilizing at least one filter function containing iteratively-updated filter parameters, which specifically includes: for an input image on which the detail enhancement processing is to be performed, extracting feature information of an $i^{th}$ iteration from the input image by utilizing at least one filter function containing filter parameters subjected to an $i^{th}$ iterative update, and obtaining a detail-enhanced image of the $i^{th}$ iteration by performing detail enhancement processing of the $i^{th}$ iteration on the input image based on the feature information of the $i^{th}$ iteration, where the input image includes an image associated with the original image, and i is an integer greater than or equal to 1; and in a case that a difference between a quality evaluation score of the input image and a quality evaluation score of the detail-enhanced image of the $i^{th}$ iteration satisfies an iteration condition, obtaining filter parameters of an $(i+1)^{th}$ iteration by updating the filter parameters of the $i^{th}$ iteration, and continuing to perform detail enhancement processing on the input image by utilizing at least one filter function containing the filter parameters of the $(i+1)^{th}$ iteration, until the difference between the quality evaluation score of the input image and the quality evaluation score of the detail-enhanced image of the $(i+1)^{th}$ iteration satisfies the iteration condition; and an enhancement output unit used for displaying a detail-enhanced image of a last iteration.

As a possible implementation, before the displaying a detail-enhanced image of a last iteration, the apparatus further includes a conversion unit specifically used for: converting the detail-enhanced image of the last iteration into an RGB detail-enhanced image.

Specifically, the enhancement output unit is further used for: displaying the RGB detail-enhanced image.

As a possible implementation, specifically, the enhancement processing unit is used for: extracting first feature information of the $i^{th}$ iteration from the original image by utilizing a first filter function containing first filter parameters subjected to an $i^{th}$ iterative update, and obtaining a first enhanced image of the $i^{th}$ iteration by performing detail enhancement processing of the $i^{th}$ iteration on the original image by utilizing the first feature information of the $i^{th}$ iteration; and extracting second feature information of the $i^{th}$ iteration from the first enhanced image by utilizing a second filter function containing second filter parameters subjected to an $i^{th}$ iterative update, and obtaining the detail-enhanced image of the $i^{th}$ iteration by performing detail enhancement processing of the $i^{th}$ iteration on the first enhanced image by utilizing the second feature information of the $i^{th}$ iteration.

As a possible implementation, specifically, the enhancement processing unit is used for: obtaining the first enhanced image of the $i^{th}$ iteration by superimposing the first feature information of the $i^{th}$ iteration on the original image; and obtaining the detail-enhanced image of the $i^{th}$ iteration by superposing the second feature information of the $i^{th}$ iteration on the first enhanced image of the $i^{th}$ iteration.

As a possible implementation, specifically, the enhancement processing unit is used for: obtaining a first filtered image of the $i^{th}$ iteration by filtering the original image by utilizing a first filter function containing first filter parameters subjected to an $i^{th}$ iterative update, and obtaining first feature information of the $i^{th}$ iteration by subtracting the first filtered image of the $i^{th}$ iteration from the original image; and obtaining a second filtered image of the $i^{th}$ iteration by filtering the first enhanced image of the $i^{th}$ iteration by utilizing a second filter function containing second filter parameters subjected to an $i^{th}$ iterative update, and obtaining second feature information of the $i^{th}$ iteration by subtracting the second filtered image of the $i^{th}$ iteration from the first enhanced image of the $i^{th}$ iteration.

As a possible implementation, the first filter function is a guided filter function, and the second filter function is a Gaussian filter function; and alternatively, the first filter function is a Gaussian filter function, and the second filter function is a guided filter function.

As a possible implementation, a quality evaluation score of the original image is a first NIQE score obtained by evaluating, based on a NIQE algorithm, a quality of the original image: and a quality evaluation score of the detail-enhanced image of the $i^{th}$ iteration is a second NIQE score obtained by evaluating, based on the NIQE algorithm, a quality of the detail-enhanced image of the $i^{th}$ iteration.

As a possible implementation, specifically, a difference judgment unit is used for: determining that a difference between the first NIQE score and the second NIQE score is less than or equal to 0, or greater than or equal to a preset threshold.

As a possible implementation, after the acquiring an original image, and before performing iterative detail enhancement processing on the original image by utilizing at least one filter function containing iteratively-updated filter parameters, the apparatus further includes a reconstruction unit specifically used for: obtaining a reconstructed image by reconstructing, based on a super-resolution algorithm, a resolution of the input image subjected to super-resolution processing to a preset resolution, where the preset resolution is higher than a resolution of the original image, the input image subjected to the super-resolution processing is the original image or a contrast-enhanced image, and the contrast-enhanced image is obtained by performing contrast enhancement processing on the original image; and taking the reconstructed image as the input image on which the detail enhancement processing is to be performed.

As a possible implementation, specifically, the reconstruction unit is used for: determining, according to a size of the original image, a super-resolution rate factor corresponding to the size; and reconstructing, according to the super-resolution rate factor and the super-resolution algorithm, the resolution of the original image to the preset resolution.

As a possible implementation, after the acquiring an original image, and before the performing iterative detail enhancement processing on the original image by utilizing at least one filter function containing iteratively-updated filter parameters, specifically, the apparatus further includes a contract enhancement unit specifically used for: taking the reconstructed image subjected to super-resolution processing or the original image not subjected to super-resolution processing as an input image, and perform iterative contrast enhancement processing by utilizing an iteratively-updated gamma value: obtaining a contrast-enhanced image of a $j^{th}$ iteration by performing, according to a gamma value subjected to a $j^{th}$ iterative update, gamma transformation on the input image on which the contrast enhancement processing is to be performed, where j is an integer greater than or equal to 1; in a case that a contrast difference between a contrast of the contrast-enhanced image of the $j^{th}$ iteration and a contrast of the input image on which the contrast enhancement processing is to be performed is greater than a contrast threshold, replacing the contrast of the input image on which the contrast enhancement processing is to be performed with the contrast of the contrast-enhanced image of the $j^{th}$ iteration, obtaining a gamma value of a $(j+1)^{th}$ iteration by updating the gamma value of the $j^{th}$ iteration, and continuing to perform iterative contrast enhancement processing on the input image on which the contrast enhancement processing is to be performed by utilizing the gamma value of the $(j+1)^{th}$ iteration, until it is determined that a contrast difference between the contrast of the contrast-enhanced image of the $j^{th}$ iteration and the contrast of the input image on which the contrast enhancement processing is to be performed is less than or equal to the contrast threshold; and taking a contrast-enhanced image of a last iteration as an input image on which the detail enhancement processing is to be performed.

As a possible implementation, before the taking a contrast-enhanced image of a last iteration as an input image on which the detail enhancement processing is to be performed, specifically; the contract enhancement unit is further used for: determining a difference between a brightness mean of the input image on which the contrast enhancement processing is to be performed and a brightness mean of the contrast-enhanced image of the last iteration; obtaining a superimposed image by superposing the difference on brightness of the contrast-enhanced image of the last iteration; and taking the superimposed image as the input image on which the detail enhancement processing is to be performed.

As a possible implementation, before the performing iterative contrast enhancement processing by utilizing an iteratively-updated gamma value, specifically, the contract enhancement unit is further used for: in a case that the reconstructed image subjected to super-resolution processing is an RGB image, obtaining an HSV original image by performing HSV conversion on the reconstructed image, and taking a V channel image of the HSV original image as the input image on which the contrast enhancement processing is to be performed; and alternatively, in a case that the original image not subjected to super-resolution processing is an RGB image, obtaining an HSV original image by performing HSV conversion on the original image, and taking a V channel image of the HSV original image as the input image on which the contrast enhancement processing is to be performed.

As a possible implementation, before the step of using the superimposed image as the input image on which the detail enhancement processing is to be performed, specifically, the contract enhancement unit is further used for: converting the superimposed image into an RGB superimposed image.

In the fourth aspect, an embodiment of the present disclosure further provides a non-transitory computer storage medium storing a computer program, the computer program being used for implementing steps of the method in the first aspect when executed by a processor.

These and other aspects of the present disclosure will be more clear and understandable from the following description of the embodiments.

BRIEF DESCRIPTION OF THE DRAWINGS

To describe the technical solutions in the embodiments of the present disclosure more clearly, the accompanying drawings required for describing the embodiments are briefly described below. Obviously, the accompanying drawings in the following description are merely some embodiments of the present disclosure, and those of ordinary skill in the art may also derive other accompanying drawings from these accompanying drawings without making inventive efforts.

DETAILED DESCRIPTION OF THE EMBODIMENTS

Figure 1:
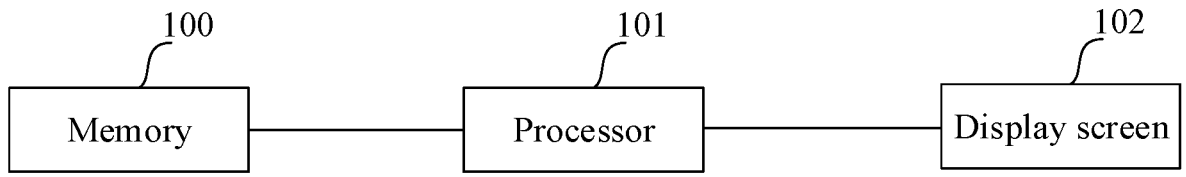
FIG. 1 is a schematic diagram of a display device provided in an embodiment of the present disclosure.

For making the objectives, technical solutions and advantages of the present disclosure more clear, the present disclosure will be further described in detail below in conjunction with the accompanying drawings. Obviously, the described embodiments are some, rather than all of the embodiments of the present disclosure. Based on the embodiments of the present disclosure, all other embodiments obtained by those of ordinary skill in the art without making inventive efforts fall within the scope of protection of the present disclosure.

In the embodiments of the present disclosure, the term "and/or", which is an association relation describing an associated object, indicates that there may be three relations, for example, A and/or B may indicate three situations: A exists alone, A and B exist at the same time, and B exists alone. The character "/" generally indicates that successive association objects are in an "or" relation.

The application scenarios described in the embodiments of the present disclosure are intended to more clearly illustrate the technical solutions in the embodiments of the present disclosure, and do not limit the technical solutions provided in the embodiments of the present disclosure. Those of ordinary skill in the art may know that, with new application scenarios provided, the technical solutions provided in the embodiments of the present disclosure are also applicable to similar technical problems. In the description of the present disclosure, the term "a plurality of" means two or more unless otherwise specified.

Theoretically, a contrast, a saturation, a color, etc. of an image picture are adjusted to enhance an image quality to a certain extent and to further improve a definition of the image quality visually. Currently, an image quality enhancement solution applied to a display device is in need of continuous adjustment of parameters according to different image types and image contents. When the image quality enhancement solution is employed, an image quality of an input image is enhanced with adjusted parameters. However, after an algorithm of the image quality enhancement solution is delivered to the display device, the adjusted parameters corresponding to the algorithm are fixed. Currently, a use scenario of image quality enhancement is generally that a display device provides an image quality enhancement option for a user, and parameters of a corresponding image quality enhancement algorithm are fixed. After receiving an image quality enhancement instruction input by the user, a delivered image quality enhancement algorithm with fixed parameters is utilized to perform the image quality enhancement algorithm with the same parameters on input images with different edge features, different high-frequency information, different resolutions, different contrasts, and different sizes, Therefore, a poor image quality enhancement effect and poor user experience are likely to be caused, which is not conducive to subsequent algorithm optimization. In the current image quality enhancement solution, the parameters used for enhancing the image quality of any input image are fixed. However, owing to the differences in contrast, saturation, color, etc. between different images, if the image qualities of different images are enhanced with the same set of parameters, it is highly possible to lead to the inferior image quality enhancement effect, and it is impossible to adaptively adjust, for different input images, parameters, and to perform the image quality enhancement processing.

According to a method for adaptively enhancing an image quality provided in the present embodiment, input images are subjected to image quality enhancement more pertinently according to feature information of different images, thereby effectively improving an adaptive capacity of an image quality enhancement algorithm, According to a core algorithm of image quality enhancement processing in the present embodiment, iterative enhancement is performed based on whether quality evaluation scores of an original image and a present enhanced image are close to each other in an iterative enhancement mode. For each iteration, the original image is enhanced by utilizing all present feature information of the original image. Then according to whether the quality evaluation scores of the original image and the present enhanced image are close to each other, it is judged whether to continue to enhance the original image. If the original image continues to be enhanced, all the present feature information is updated, so that the original image continues to be enhanced with all updated feature information until quality evaluation scores of the original image and a present enhanced image are close to each other, An image subjected to last enhancement processing is output as an image after the input original image is subjected to the image quality enhancement processing. The present iteration in the present embodiment specifically refers to an $i^{th}$ iteration in an iterative detail enhancement process, $i \geq 1$.

In the present embodiment, all filter parameters are required to be updated every time enhancement processing is performed, and all the feature information is updated with all updated filter parameters, so that the original image continues to be enhanced by utilizing all the updated feature information. According to the image quality enhancement algorithm in the present embodiment, the original image may be further enhanced based on feature information of the original image, by utilizing feature information extracted from the original image, to make the original image more clear visually and to enhance the image quality. With some semantic information (feature information) of the original image enhanced, the image quality of the input original image may be enhanced to the greatest extent, thereby effectively improving the image quality enhancement effect.

The method for adaptively enhancing an image quality provided in the present embodiment is principally applied to a display device. The display device includes, but is not limited to, a large-sized (generally over 50 inches) intelligent interactive display device, a large-sized electronic whiteboard, a large-sized display screen (which may be a spliced screen), etc.

As shown in FIG. 1, a display device system provided in an embodiment of the present disclosure includes a memory 100, a processor 101, and a display screen 102.

The memory 100 stores computer-readable instructions.

When running the computer-readable instructions, the processor 101 is configured for: acquiring an original image, and utilizing at least one filter function containing iteratively-updated filter parameters, to perform iterative detail enhancement processing on the original image, which specifically includes: for an input image on which the detail enhancement processing is to be performed, utilize at least one filter function containing filter parameters subjected to an $i^{th}$ iterative update, to extract feature information of an $i^{th}$ iteration from the input image, and utilize the feature information of the $i^{th}$ iteration, to perform detail enhancement processing of the $i^{th}$ iteration on the input image, so as to obtain a detail-enhanced image of the $i^{th}$ iteration, the input image including an image related to the original image, and i being an integer greater than or equal to 1; and update, when it is determined that a difference between quality evaluation scores of the input image and the detail-enhanced image of the $i^{th}$ iteration satisfies an iteration condition, the filter parameters of the $i^{th}$ iteration, to obtain filter parameters of an $(i+1)^{th}$ iteration, and utilize at least one filter function containing the filter parameters of the $(i+1)^{th}$ iteration, to continue to perform detail enhancement processing on the input image until a difference between quality evaluation scores of the input image and a detail-enhanced image of the $(i+1)^{th}$ iteration satisfies the iteration condition.

The display screen 102 is configured for displaying a detail-enhanced image of a last iteration.

In some embodiments, the detail-enhanced input image is related to the original image, including, but not limited to, the original image, a V channel image of an HSV original image, etc.

It should be noted that, a process of image quality enhancement performed by the display device in the present embodiment is imperceptible for a user, and the display screen 102 may directly display the detail-enhanced image, to implement image quality enhancement processing.

In an implementation, the feature information corresponds to the filter parameters in one to one correspondence, and the filter function only corresponds to the filter parameters. The filter parameters of at least one initial filter function are preset. The filter parameters in the present embodiment are used for representing a size of a filter window: Any of the filter parameters in the present embodiment is updated by gradually increasing the size of the filter window by superimposing a preset step length on each of the filter parameters of the $i^{th}$ iteration, or by gradually reducing the size of the filter window by subtracting the preset step length from each of the filter parameters of the $i^{th}$ iteration. Specific manners of updating the filter parameters are not limited excessively in the present embodiment.

In some embodiments, feature information of the original image is extracted according to the filter parameters of at least one filter function, to determine the feature information of the original image. The feature information in the present embodiment includes, but is not limited to, at least one of edge feature information and high-frequency information.

In some embodiments, the filter functions in the present embodiment include, but are not limited to, at least one of a guided filter function and a Gaussian filter function.

In some embodiments, a quality of an image is evaluated based on a natural image quality evaluator (NIQE) algorithm. NIQE is a natural image quality evaluation method, and used to calculate spatial natural scene statistics (NSS) features of natural images, and then to fit a multivariate Gaussian (MVG) model, to calculate a mean and a covariance of the multivariate Gaussian model through 125 natural images. The multivariate Gaussian model is utilized to determine a NIQE score of the input image, where the multivariate Gaussian model has public and directly-accessible weights. When calculating the NIQE score, means and variances of MVGs of images to be tested (including the original image and the detail-enhanced image) are calculated first, and then a distance between the image to be tested and the natural images is calculated, where the smaller the distance is, the lower the NIQE score is, which indicates that a more real image to be tested and a better quality are provided.

In the present embodiment, the quality evaluation score of the original image is a first NIQE score obtained by evaluating, based on the natural image quality evaluator (NIQE) algorithm, a quality of the original image.

A quality evaluation score of the detail-enhanced image of the $i^{th}$ iteration is a second NIQE score obtained by evaluating, based on the NIQE algorithm, a quality of the detail-enhanced image of the $i^{th}$ iteration.

Optionally, whether the iteration condition is satisfied is determined in the following manner: if a difference between the first NIQE score and the second NIQE score is less than or equal to 0 or greater than or equal to a preset threshold, it is determined that the iteration condition is satisfied; and if a difference between the first NIQE score and the second NIQE score is greater than 0 and less than a preset threshold, it is determined that the difference does not satisfy the iteration condition, and the detail-enhanced image of the $i^{th}$ iteration is directly output.

It should be noted that the NIQE scores are strongly correlated with the filter parameters, and appropriate filter parameters may make the NIQE scores minimized locally on the original image or the enhanced image, so that all the filter parameters are updated based on the NIQE scores, to determine the most appropriate filter parameter.

In an implementation, the total number of iterations is determined based on a difference between average quality scores of the original image and the present enhanced processing image. The feature information of the original image is changed in each iteration, that is, different feature information of an original image input each time is provided. In the process of the iterative enhancement processing, by changing the feature information of the original image input each time, an image quality obtained after utilizing the feature information to enhance the original image is closer to the quality of the original image, and the image quality will not be reduced after the image quality is enhanced.

Figure 2:
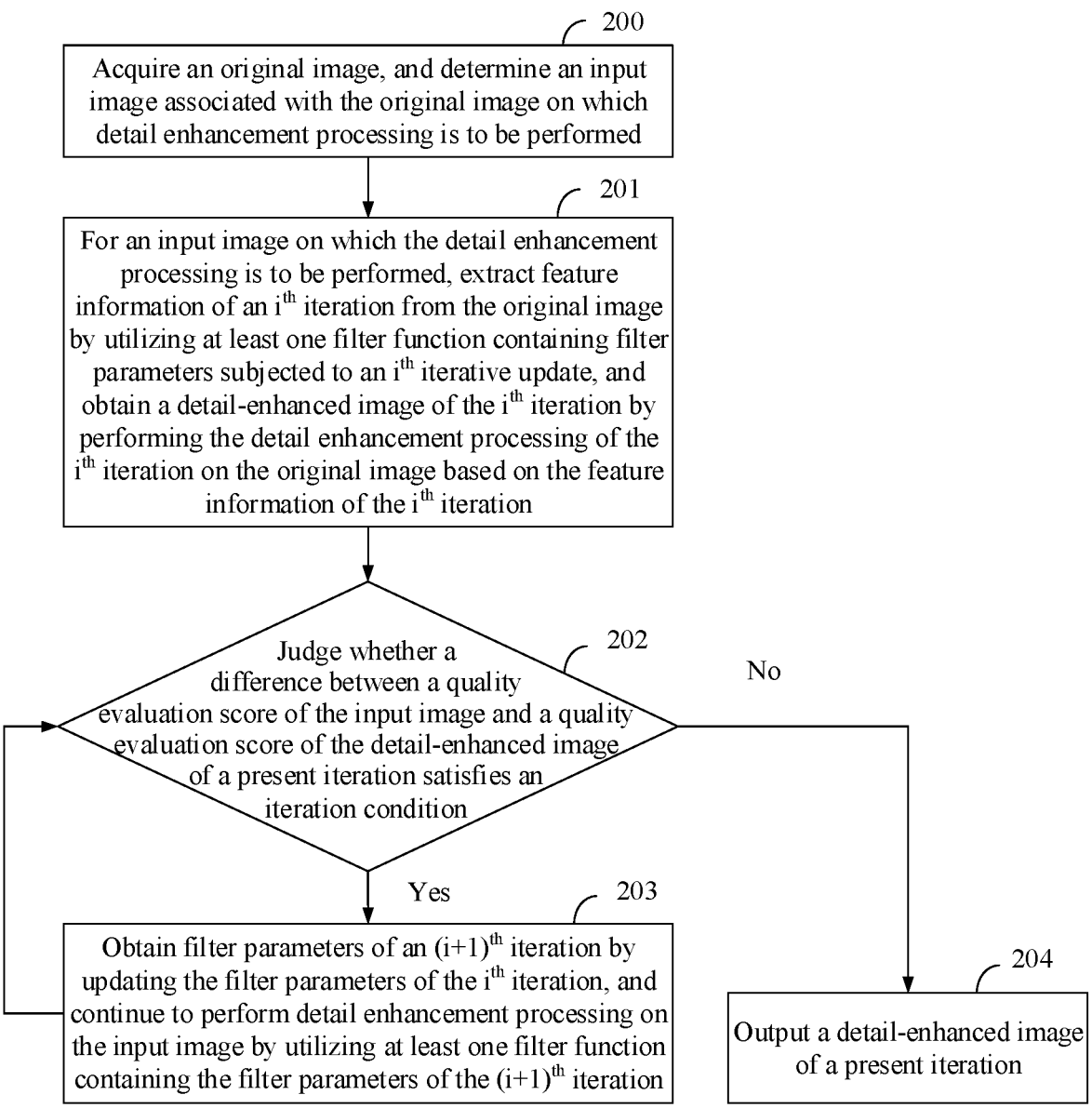
FIG. 2 is a flow chart of iteration of adaptive enhancement processing provided in an embodiment of the present disclosure.

As shown in FIG. 2, an iterative process of adaptive detail enhancement processing in the present embodiment is as follows.

Step 200, acquire an original image, and determine an input image, associated with the original image, on which detail enhancement processing is to be performed.

Optionally, the original image includes, but is not limited to, an RGB image, an HSV image, or an image in another format, and the format of the original image is not limited excessively in the present embodiment.

It should be noted that the detail-enhanced input image in the present embodiment includes, but is not limited to, any one or more of the following: an original image: a V channel image obtained by performing HSV conversion on the original image: a reconstructed image obtained by performing super-resolution processing on the original image; and a contrast-enhanced image or superimposed image obtained by performing contrast enhancement processing on the original image.

Step 201, for the input image on which the detail enhancement processing is to be performed, extract feature information of an $i^{th}$ iteration from the input image by utilizing at least one filter function containing filter parameters subjected to an $i^{th}$ iterative update, and obtain a detail-enhanced image of the $i^{th}$ iteration by performing the detail enhancement processing of the $i^{th}$ iteration on the input image based on the feature information of the $i^{th}$ iteration, where the input image includes an image associated with the original image, and i being an integer greater than or equal to 1.

In some embodiments, the present embodiment provides a cascaded detail enhancement processing manner, which specifically includes utilize two filter functions (a first filter function and a second filter function), to perform cascaded detail enhancement processing, where the first filter function contains first filter parameters, the second filter function contains second filter parameters, and in the process of the iterative detail enhancement processing, both the first filter parameters and the second filter parameters are updated iteratively. In an implementation, the first filter function containing the first filter parameters subjected to the $i^{th}$ iterative update is utilized first, to enhance the original image, to obtain a first enhanced image, then the second filter function containing the second filter parameters subjected to the $i^{th}$ iterative update is utilized to enhance the first obtained enhanced image, and feature information corresponding to different filter parameters is utilized to continue to perform detail enhancement processing in a cascaded enhancement processing manner, on the original image, thereby improving an image quality enhancement processing effect in the end, and making the image quality more clear. A specific implementation process is as follows.

It should be noted that the feature information in the present embodiment corresponds to the filter parameters and the filter functions in one-to-one correspondence, the first filter function extracts features from the original image, to obtain first feature information, and the second filter function extracts feature from the first enhanced image, to obtain second feature information. In some embodiments, the first filter function is a guided filter function, the second filter function is a Gaussian filter function, the first feature information is used for representing an edge feature of the original image, and the second feature information is used for representing high-frequency information of the original image. Alternatively, the first filter function is a Gaussian filter function, the second filter function is a guided filter function, the first feature information is used for representing a high-frequency feature of the original image, and the second feature information is used for representing edge information of the original image. The first filter parameters are used for representing a size of a first filter window of the guided filter function, and the second filter parameters are used for representing a size of a second filter window of the Gaussian filter function.

In an implementation, the utilizing at least one filter function containing filter parameters subjected to an $i^{th}$ iterative update, to extract feature information of the $i^{th}$ iteration from the original image, and utilizing the feature information of the $i^{th}$ iteration, to perform detail enhancement processing of the $i^{th}$ iteration on the original image, to obtain a detail-enhanced image of the $i^{th}$ iteration specifically includes.

Process 1-1, utilize a first filter function containing first filter parameters subjected to an $i^{th}$ iterative update, to extract first feature information of the $i^{th}$ iteration from the original image, and utilize the first feature information of the $i^{th}$ iteration, to perform detail enhancement processing of the $i^{th}$ iteration on the original image, to obtain a first enhanced image of the $i^{th}$ iteration.

In an implementation, in the present embodiment, the first feature information corresponds, one-to-one, to the first filter parameters, and the first feature information of the $i^{th}$ iteration is superimposed on the original image, to obtain the first enhanced image of the $i^{th}$ iteration. Specifically, the first enhanced image is determined in the following manner.

a) Utilize the first filter function containing the first filter parameters subjected to the $i^{th}$ iterative update, to filter the original image, so as to obtain the first filtered image of the $i^{th}$ iteration.

In some embodiments, the first filter parameters may be the size of the first filter window used for representing guided filter. When the first filter parameters are utilized to perform the guided filter on the original image, since the guided filter is required to determine a guide image in advance, the guide image may be an individual image or the original image, and is used for indicating a smooth region and an edge region in the first filtered image. When the guide image is an input original image, the guided filter is used for preserving a filter operation of an edge of the original image, and may be applied to image reconstruction. In a specific implementation, a first feature image is determined in the following manner.

a1) Perform, according to the first filter parameters and the guide image obtained by performing mean filter on the original image, guided filter on the original image, to obtain a guided filtered image (that is, the first filtered image).

In an implementation, the mean filter is a typical linear filter algorithm. In consideration of a frequency domain, the mean filter is a low-pass filter, to remove high-frequency signals, thereby assisting in eliminating sharp noise from the image, and realizing image smoothing, blurring, etc. An ideal mean filter is to replace each pixel in the image with a mean of each pixel and its surrounding pixels (for example, 4 neighboring pixels or 8 neighboring pixels). Sampling Kernel data are generally a 3×3 matrix, and all the pixels in the image are calculated from left to right and from top to bottom, and finally a processed image is obtained. The mean filter may also be added with two parameters, that is, the number of iterations, and a size of the Kernel. For the same Kernel, an increasingly better effect will be realized after multiple iterations. Similarly, for the same number of iterations, the larger a Kernel matrix is, the more significant the effect of the mean filter is. The Kernel of the mean filter and the number of iterations specifically selected are not limited excessively in the present embodiment.

a2) Subtract the first filtered image of the $i^{th}$ iteration from the original image, to obtain the first feature information of the $i^{th}$ iteration, that is, subtract the guided filtered image of the $i^{th}$ iteration from the original image, to obtain the first feature image containing the first feature information of the $i^{th}$ iteration.

Since the guided filtered image is obtained by filtering out the edge feature of the original image, the first feature image containing the edge feature of the original image may be obtained by subtracting the guided filtered image from the original image. It should be noted that the image may be represented by a pixel matrix. Therefore, a subtraction between the images specifically refers to a subtraction between pixel matrixes corresponding to different images, that is, a subtraction between a pixel matrix corresponding to the original image and a pixel matrix corresponding to the guided filtered image.

In the present embodiment, the filtered image obtained by performing the mean filter on the original image is used as the guide image, so that an edge may be well extracted from the guided filtered image obtained by filtering the input original image for enhancing the input original image for clarity. The size of the kernel of the filter window of the guided filter is updatable, and the larger the kernel is, the better the enhancement effect on the original image is. However, when the kernel is enlarged to a certain extent, the enhanced image is likely to be distorted.

b) Superimpose the first feature information of the $i^{th}$ iteration on the original image, to obtain a first enhanced image of the $i^{th}$ iteration.

Since the first feature image contains the edge feature of the original image, the original image is enhanced by superimposing the first feature image on the original image, and the edge feature of the original image is enhanced. It should be noted that the image may be represented by the pixel matrix. Therefore, a superposition of the images specifically refers to a superposition between the pixel matrixes corresponding to different images, that is, a superposition between the pixel matrix corresponding to the original image and the pixel matrix corresponding to the first feature image.

Process 1-2, utilize a second filter function containing second filter parameters subjected to an $i^{th}$ iterative update, to extract second feature information of the $i^{th}$ iteration from the first enhanced image, and utilize the second feature information of the $i^{th}$ iteration, to perform detail enhancement processing of the $i^{th}$ iteration on the first enhanced image, to obtain the detail-enhanced image of the $i^{th}$ iteration.

It should be noted that the second feature information corresponds to the second filter parameters, the second filter parameters are used for representing a size of a second filter window of Gaussian filter, and second enhancement processing is actually to perform Gaussian filter on the first enhanced image, and to utilize high-frequency information extracted by the Gaussian filter to continue to enhance the first enhanced image. In an implementation, the present enhanced image is determined in the following manner.

c) Utilize the second filter function containing the second filter parameters subjected to the $i^{th}$ iterative update, to filter the first enhanced image of the $i^{th}$ iteration, so as to obtain a second filtered image of the $i^{th}$ iteration.

In some embodiments, the second filter parameters represent the size of the second filter window of the Gaussian filter. It should be noted that the sizes of the filter windows in the present embodiment refer to sizes of kernels of the filter windows used.

In accordance with an image processing concept, the Gaussian filter associates image frequency domain processing with time domain processing, and serves as a low-pass filter, to obtain low-frequency information of the image, and further to calculate the high-frequency information of the image obtained through filtering out, to smooth the image. The linear and smooth Gaussian filter is suitable for eliminating Gaussian noise, and applied to a noise reduction process of image processing in a wide range. The Gaussian filter is a process of performing weighted average on an entire image, and a value of each pixel is obtained by performing weighted average on the value and values of other neighboring pixels. A specific operation of the Gaussian filter is as follows: scan each pixel in the image with a template (or referred to as a convolution or mask), and replace a value of a central pixel of the template with a weighted average gray value of the neighboring pixels determined through the template. It is very effective to use a Gaussian smoothing filter to suppress noise that obeys normal distribution. In the present embodiment, the Gaussian filter is used as a detail extractor for further enhancement, thereby effectively extracting some details from the image and enhancing a contrast of the image. The size of the filter window of the Gaussian filter is also updatable, where the larger the filter window is, the more obvious the enhancement processing effect is. However, when the filter window reaches a certain degree, the enhanced image will also be distorted. In a specific implementation, a second feature image is determined in the following manner.

c1) Perform, according to the second filter parameters, Gaussian filter on the first enhanced image, to obtain a Gaussian filtered image (that is, a second filtered image).

It should be noted that the Gaussian filter is a low-pass filter, which may obtain the low-frequency information of the first enhanced image, to obtain the high-frequency information of the first enhanced image through the following steps, thereby continuing to enhance the first enhanced image.

c2) Subtract the second filtered image of the $i^{th}$ iteration from the first enhanced image of the $i^{th}$ iteration, to obtain the second feature image containing the second feature information of the $i^{th}$ iteration.

Since the low-frequency information of the first enhanced image is obtained through the Gaussian filtered image, the high-frequency information of the first enhanced image, that is, the second feature information, may be obtained by subtracting the Gaussian filtered image from the first enhanced image. Since the image may be represented by the pixel matrix, the second feature image containing the high-frequency information is actually obtained by subtracting the Gaussian filtered image from the first enhanced image.

d) Superpose the second feature information of the $i^{th}$ iteration on the first enhanced image of the $i^{th}$ iteration, to obtain the detail-enhanced image of the $i^{th}$ iteration, that is, superpose the first enhanced image on the second feature image, to obtain the detail-enhanced image of the $i^{th}$ iteration.

Since the high-frequency information has been extracted, the high-frequency information of the original image may be further enhanced by superimposing the second feature image containing the high-frequency information on the first enhanced image, so that a clearer enhanced image is obtained.

In the implementation process described above, optionally, the first filter function is the Gaussian filter function, and the second filter function is the guided filter function.

It should be noted that an order of performing first enhancement processing and the second enhancement processing in the cascaded enhancement method in the present embodiment is adjustable. An optional implementation is as follows.

Process 2-1, utilize a second filter function containing second filter parameters subjected to an $i^{th}$ iterative update, to extract second feature information of an $i^{th}$ iteration from the original image, and utilize the second feature information of the $i^{th}$ iteration, to perform detail enhancement processing of the $i^{th}$ iteration on the original image, to obtain a first enhanced image of the $i^{th}$ iteration.

Process 2-2, utilize a first filter function containing first filter parameters subjected to an $i^{th}$ iterative update, to extract first feature information of the $i^{th}$ iteration from the first enhanced image, and utilize the first feature information of the $i^{th}$ iteration, to perform detail enhancement processing of the $i^{th}$ iteration on the first enhanced image, to obtain the detail-enhanced image of the $i^{th}$ iteration.

The second filter function is a Gaussian filter function, and the first filter function is a guided filter function.

Either of the two processes described above may be implemented, which is not limited excessively in the present embodiment. Reference may be made to contents in Processes 1-1 and 1-2 for specific implementation steps in Processes 2-1 and 2-2, which will not be described in detail herein.

Step 202: judge whether a difference between a quality evaluation score of the input image and a quality evaluation score of the detail-enhanced image of the present iteration satisfies an iteration condition, if yes, execute step 203, otherwise execute step 204.

Step 203: obtain filter parameters of an $(i+1)^{th}$ iteration by updating the filter parameters of the $i^{th}$ iteration, continue to perform detail enhancement processing on the input image by utilizing at least one filter function containing the filter parameters of the $(i+1)^{th}$ iteration, and return to step 202.

Step 204, output a detail-enhanced image of the present iteration.

In some embodiments, if the original image is a red(R)-green (G)-blue (B) (RGB) image, in order to avoid a color change of the enhanced original image, the present embodiment may further convert the original image into a hue (H)-saturation (S)-value (V) (HSV) image, and perform detail enhancement processing only on a V channel image of the HSV image.

In a specific implementation, after acquiring an original image, and before utilizing at least one filter function containing iteratively-updated filter parameters, to perform iterative detail enhancement processing on the original image, when it is determined that the original image is the RGB image, the original image is subjected to HSV conversion, to obtain an HSV original image, a V channel image of the HSV original image is used as the input image on which the detail enhancement processing is to be performed, and at least one filter function containing the iteratively-updated filter parameters is utilized to perform iterative detail enhancement processing on the V channel image of the HSV original image. It should be noted that, after the original image is replaced with the V channel image, in an iterative process of utilizing the method described above to perform the enhancement processing, the V channel image of the original image is subjected to the enhancement processing, instead of the RGB image. Since a color channel is not subjected to the enhancement processing, the method for enhancing an image quality in the present embodiment does not change colors of the original image, to ensure that a color effect of the enhanced image is not distorted.

In some embodiments, if at least one filter function containing the iteratively-updated filter parameters, to perform the iterative detail enhancement processing on the V channel image of the HSV original image, a detail-enhanced image of a last iteration is also a V channel image. Before display, the detail-enhanced image of the last iteration is further required to be converted into an RGB detail-enhanced image, and then the RGB detail-enhanced image is displayed.

It should be noted that after the original image is replaced with the V channel image of the HSV image, all the present feature information is utilized to enhanced the input V channel image, to obtain the present enhanced image. A difference between quality evaluation scores of the V channel image and the present enhanced image is determined. When the iteration condition is satisfied, all the present filter parameters are updated, and all updated filter parameters are utilized to determine all updated feature information. All the updated feature information is used as all feature information for a next iteration, to continue to enhance the V channel image until it is determined that the difference does not satisfy the iteration condition. The image subjected to last enhancement processing is output. Since the original image is the V channel image, the image subjected to the last enhancement processing is also a V channel image. Therefore, in order to restore the enhanced image into the RGB image for display, the image subjected to the last enhancement processing is converted into an RGB image before being output, and then the RGB image is output.

Figure 3:
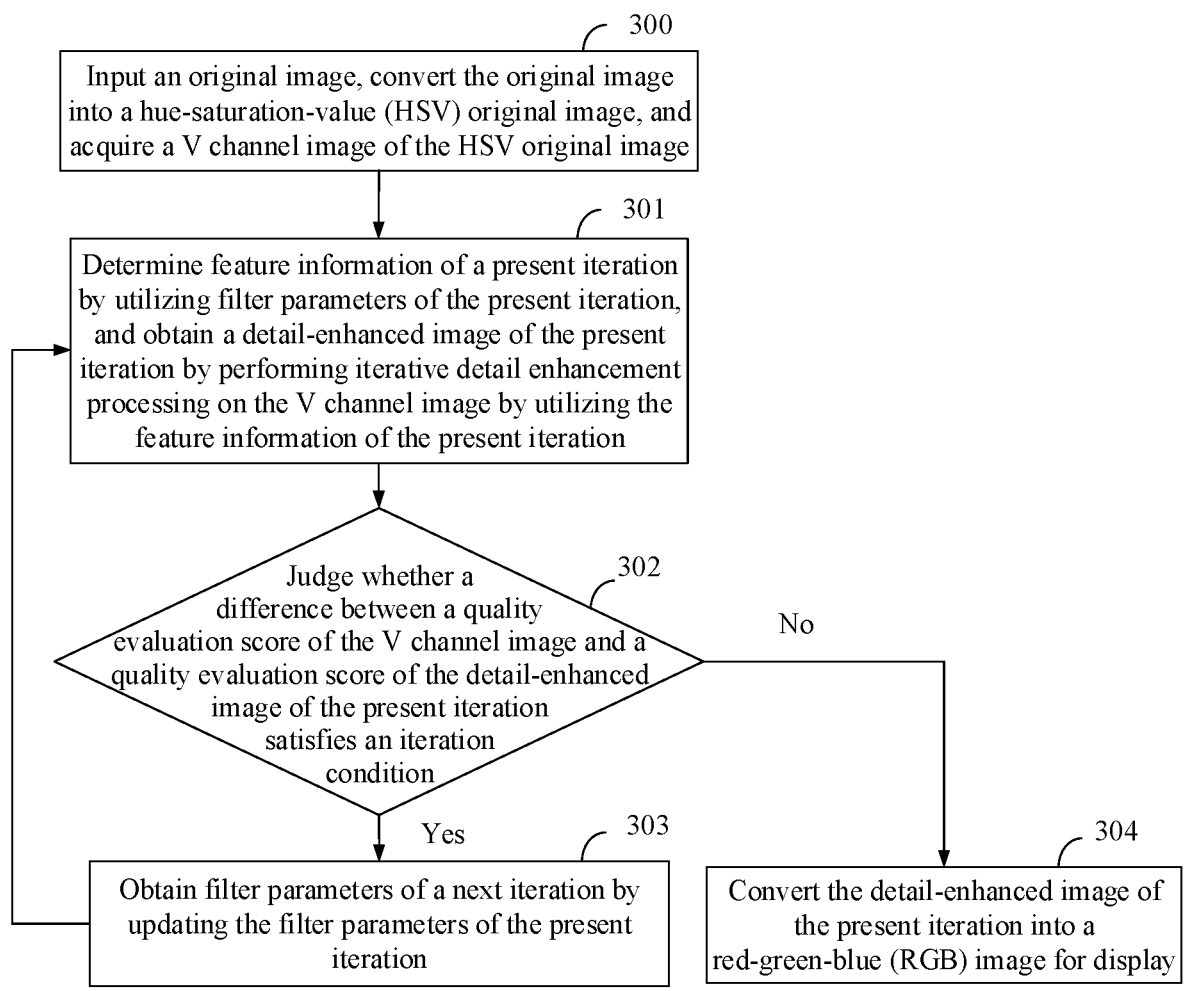
FIG. 3 is an implementation flow chart of enhancing a V channel image of an original image provided in an embodiment of the present disclosure.

As shown in FIG. 3, for example, by using a detail-enhanced input image as an original image, an implementation flow of detail enhancement processing on a V channel image of an original image in the present embodiment is as follows.

Step 300, input the original image, convert the original image into an HSV original image, and acquire a V channel image of the HSV original image.

Step 301, determine feature information of the present iteration by utilizing filter parameters of the present iteration, and obtain a detail-enhanced image of the present iteration by perform iterative detail enhancement processing on the V channel image by utilizing the feature information of the present iteration.

The filter parameters correspond, one-to-one, to filter functions and correspond, one-to-one, to the feature information. The present iteration is used for representing an $i^{th}$ iteration.

Step 302, judge whether a difference between a quality evaluation score of the V channel image and a quality evaluation score of the detail-enhanced image of the present iteration satisfies an iteration condition, if yes, execute step 303, otherwise execute step 304.

Step 303, obtain filter parameters of a next iteration by updating the filter parameters of the present iteration, and return to step 301.

Step 304, convert the detail-enhanced image of the present iteration into an RGB image for display.

Figure 4:
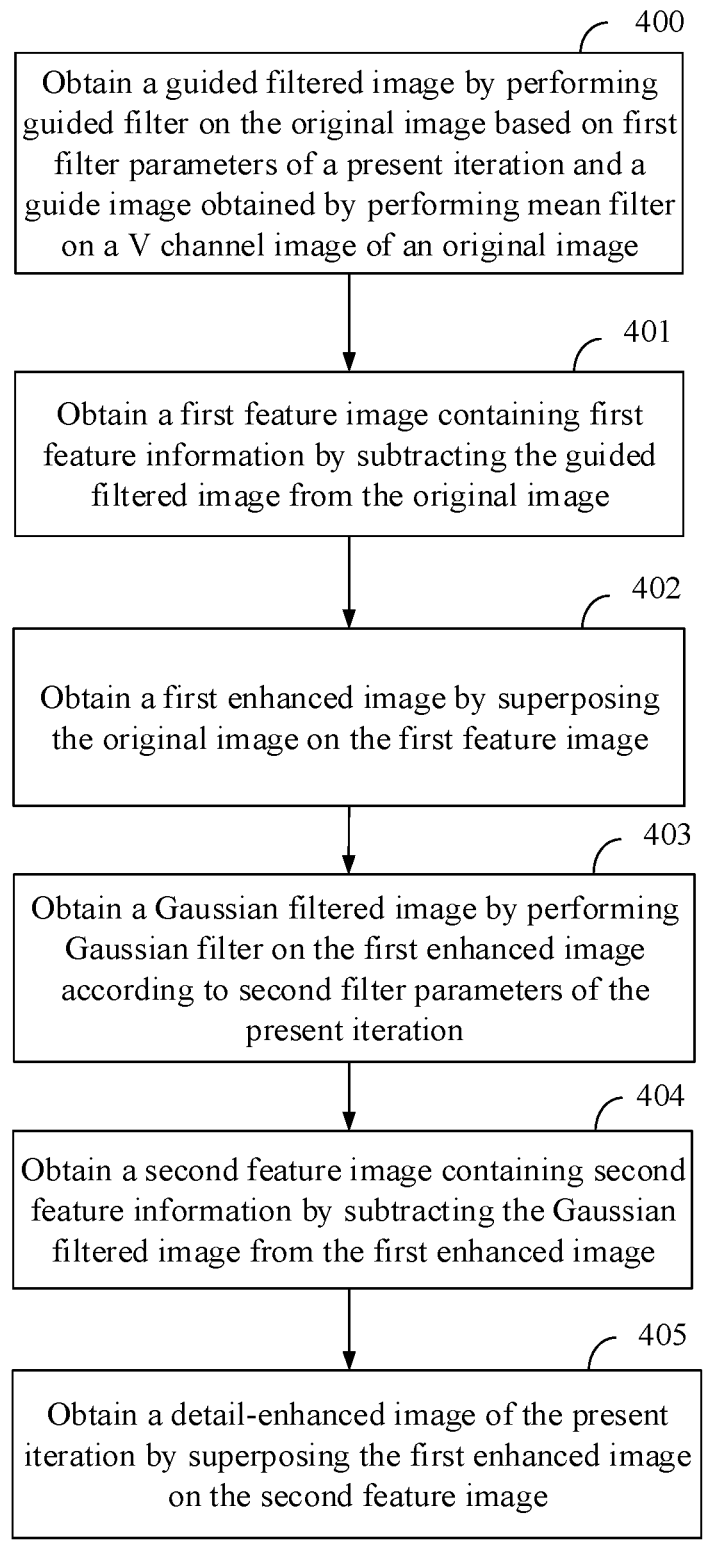
FIG. 4 is a specific implementation flow chart for one-time enhancement processing provided in an embodiment of the present disclosure.

In the present embodiment, all the filter parameters are first utilized each time to determine all the feature information, and then all the feature information is utilized to enhance the original image, to obtain an image enhanced each time, and different enhancement processing processes differ in used filter parameters. As shown in FIG. 4, a specific implementation flow of detail enhancement processing in the present embodiment is as follows.

Step 400, obtain a guided filtered image by performing guided filter on the original image based on first filter parameters of a present iteration and a guide image obtained by performing mean filter on a V channel image of an original image.

Step 401, obtain a first feature image containing first feature information by subtracting the guided filtered image from the original image.

Step 402, obtain a first enhanced image by superposing the original image on the first feature image.

Step 403, obtain a Gaussian filtered image by performing Gaussian filter on the first enhanced image according to second filter parameters of the present iteration.

Step 404, obtain a second feature image containing second feature information by subtracting the Gaussian filtered image from the first enhanced image.

Step 405, obtain a detail-enhanced image of the present iteration by superposing the first enhanced image on the second feature image.

In this case, the enhanced image is a V channel image.

In some embodiments, in the present embodiment, before detail enhancement processing is performed in the above manner, a resolution of the original image may also be enhanced through a super-resolution processing method in which the resolution of the original image is reconstructed through a super-resolution reconstruction algorithm (also referred to as a super-resolution algorithm or super-resolution stretching), to improve a definition of the original image. A specific implementation flow of the method is as follows.

Reconstruct, based on a super-resolution algorithm, a resolution of an input image subjected to super-resolution processing to a preset resolution, to obtain a reconstructed image, the preset resolution being higher than the resolution of the original image; and use the reconstructed image as an input image on which the detail enhancement processing is to be performed.

The input image subjected to the super-resolution processing is the original image or a contrast-enhanced image, and the contrast-enhanced image is obtained by performing contrast enhancement processing on the original image.

The super-resolution algorithm is to restore detail contents of an image when enlarging the image. The super-resolution algorithm utilizes relevant knowledge in the fields of digital image processing, computer vision, etc., to reconstruct, by means of a specific algorithm and a specific processing flow; a high-resolution image from a given low-resolution image. The super-resolution algorithms include a traditional algorithm and a deep learning algorithm.

Currently, the traditional super-resolution algorithm principally relies on a basic digital image processing technology for reconstruction, such as an interpolation based super-resolution reconstruction. Specifically, the traditional super-resolution algorithm utilizes known pixel information to fit unknown pixel information on a plane, and is generally completed through a predefined transformation function or interpolation kernel. An interpolation based method is simple and easy to understand, but it also has some obvious defects, which often lead to blurred and jagged restored images, etc. Common interpolation based methods include a nearest neighbor interpolation method, a bilinear interpolation method, a bicubic interpolation method, etc.

In the present embodiment, the deep learning algorithm is used for the super-resolution reconstruction. High-level abstract features of an image are extracted through multi-layer nonlinear transformation, and a potential distribution rule of the image is learned, to obtain a capacity to make reasonable judgment or prediction on the reconstructed image. The super-resolution algorithms used in the present embodiment include, but are not limited to, at least one of super resolution convolutional network (SRCNN), very deep convolutional networks super resolution (VDSR), enhanced deep super-resolution network (EDSR), and super resolution generative adversarial network (SRGAN).

In some embodiments, the preset resolutions in the present embodiment include, but are not limited to, at least one of a 4K resolution and a 8K resolution, and the preset resolutions are far higher than the resolution of the original image. A specific super-resolution reconstruction flow is as follows.

Firstly, determine, according to a size of the original image, a super-resolution rate factor corresponding to the size. Secondly, reconstruct, according to the super-resolution rate factor and a super-resolution algorithm, a resolution of the original image to a preset resolution.

In the flow: a plurality of super-resolution rate factors may be preset, the smaller the size is, the larger the super-resolution rate factor corresponding to the size is, and the super-resolution rate factor corresponding to the size of the original image is utilized, to reconstruct a super-resolution, so that the super-resolution rate factor is dynamically determined based on an input original image, that is, a stretching ratio of the input original image is determined, to balance an effect and a response time of the super-resolution algorithm.

Figure 5:
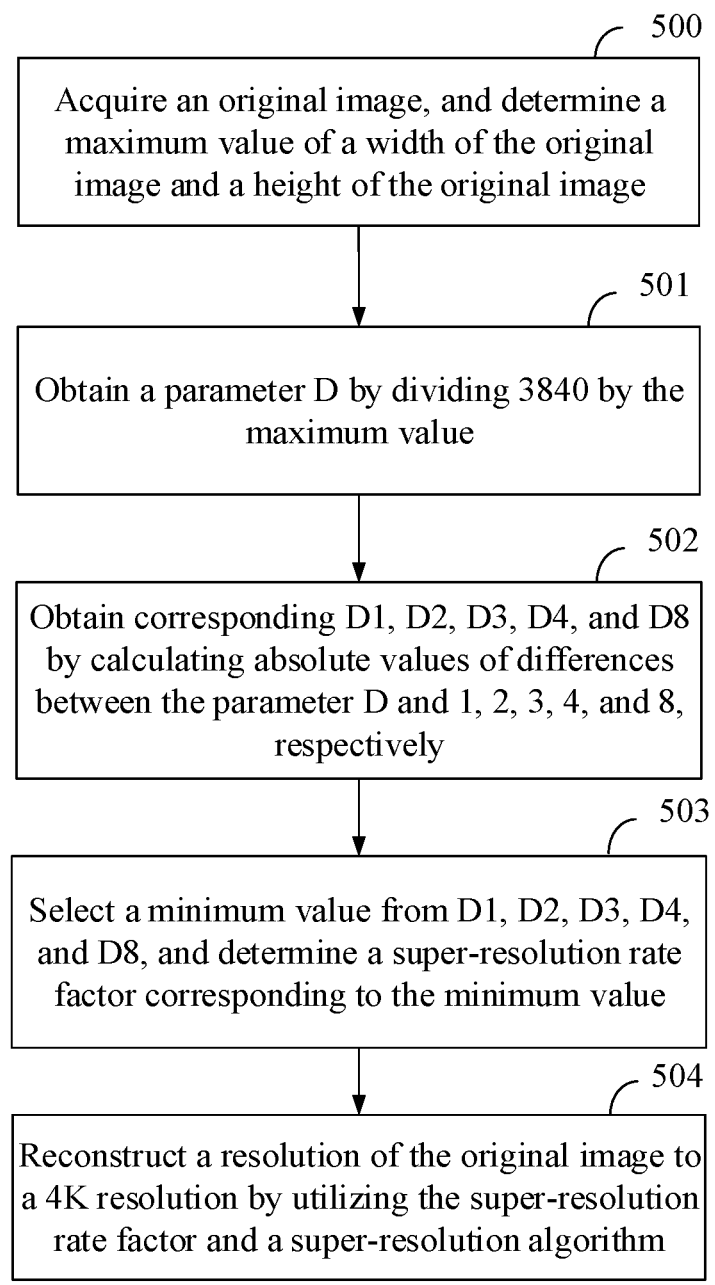
FIG. 5 is an implementation flow chart of a super-resolution reconstruction method provided in an embodiment of the present disclosure.

As shown in FIG. 5, a 4K preset resolution is provided, for example, a super-resolution reconstruction method in the present embodiment is described as follows.

Step 500, acquire an original image, and determine a maximum value of a width of the original image and a height of the original image.

Step 501, obtain a parameter D by dividing 3840 by the maximum value.

Optionally, the above 3840 may be replaced with a pixel value within a range of a 4K resolution, which is not limited excessively in the present embodiment.

Step 502, obtain corresponding D1, D2, D3, D4, and D8 by calculating absolute values of differences between the parameter D and 1, 2, 3, 4, and 8, respectively.

1, 2, 3, 4, and 8 may be selected according to requirements, and are merely exemplarily shown herein for judging closeness of D to a 1K resolution, a 2K resolution, a 3K resolution, the 4K resolution, and a 8K resolution, respectively. Numerical values selected based on the judgment principle all fall with the scope of protection of the present disclosure, which is not listed herein one by one.

Step 503, select a minimum value from D1, D2, D3, D4, and D8, and determine a super-resolution rate factor corresponding to the minimum value.

In an implementation, if D1 is minimum, it means that the resolution of the original image is close to 4K, and a super-resolution rate factor corresponding to D1 is 1, that is, the original image is stretched to 4K by directly utilizing the bicubic interpolation method.

If D2 is minimum, it means that the resolution of the original image is close to 2K, a super-resolution rate factor corresponding to D2 is 2, and the original image is stretched to 4K based on a 2-fold super-resolution algorithm.

If D3 is minimum, it means that the resolution of the original image is close to 1.5K, a super-resolution rate factor corresponding to D3 is 3, and the original image is stretched to 4K based on a 3-fold super-resolution algorithm.

If D4 is minimum, it means that the resolution of the original image is close to 1K, a super-resolution rate factor corresponding to D4 is 4, and the original image is stretched to 4K based on a 4-fold super-resolution algorithm.

If D5 is minimum, it means that the resolution of the original image is close to 0.5K, a super-resolution rate factor corresponding to D5 is 8, and the original image is stretched to 4K based on a 8-fold super-resolution algorithm.

Step 504, reconstruct the resolution of the original image to the 4K resolution by utilizing the super-resolution rate factor and the super-resolution algorithm.

After the resolution of the original image is reconstructed to the preset resolution in the above manner, a reconstructed image is subjected to iterative detail enhancement processing, that is, the reconstructed image is used as an input image on which the detail enhancement processing is to be performed, to be subjected to the detail enhancement processing. Therefore, after the resolution of the original image is reconstructed, the reconstructed image further continues to be subjected to detail enhancement processing, thereby effectively improving the definition of the original image, which is particularly suitable for display requirements of an oversized display device, and providing ultra-clear video watching experience for a user.

In some embodiments, in order to further enhance the image quality of the original image, a contrast of the original image may also be enhanced. It should be noted that in the present embodiment, there is no requirement on an order of an implementation solution to super-resolution reconstruction and an implementation solution to contrast enhancement of the original image. In a specific implementation, the super-resolution algorithm may be utilized first, to reconstruct the resolution of the original image to the preset resolution, to obtain the reconstructed image. Then the reconstructed image is subjected to the contrast enhancement processing. Finally all the feature information is utilized, to continue to enhance a contrast-enhanced image. In some embodiments, the original image may also be subjected to contrast enhancement processing first. Then a contrast-enhanced image obtained is subjected to super-resolution processing. Finally a reconstructed image obtained through the super-resolution processing is subjected to detail enhancement processing.

In some embodiments, the original image is subjected to the detail enhancement processing. Specifically, the V channel image of the HSV original image may be subjected to the detail enhancement processing, to obtain the detail-enhanced image. Then the detail-enhanced image is converted into the RGB detail-enhanced image. Similarly, the original image is subjected to the contrast enhancement processing. Specifically, the V channel image of the HSV original image may be subjected to the contrast enhancement processing, to obtain the contrast-enhanced image or the superimposed image. Then the contrast-enhanced image or the superimposed image is converted into the RGB image.

In some embodiments, an implementation principle of the contrast enhancement processing in the present embodiment is to utilize iterative gamma transformation to continuously perform the contrast enhancement processing on the reconstructed image subjected to the super-resolution processing or the original image not subjected to the super-resolution processing. A gamma value is updated in an iterative process. It is required to utilize a present gamma value to perform gamma transformation on the reconstructed image or the original image in each iterative process, and to calculate a contrast difference between a changed image and the original image. If the contrast difference is greater than a contrast threshold, the gamma value is updated and then an updated gamma value continues to be used to perform gamma transformation on the reconstructed image or the original image until a contrast difference between an image subjected to the gamma transformation and the original image is less than or equal to the contrast threshold, it is determined that the image subjected to the gamma transformation is an enhanced image in this case, and output to a display device for display.

An implementation flow of the contrast enhancement processing solution in the present embodiment is described as follows.

Use the reconstructed image subjected to super-resolution processing or the original image not subjected to super-resolution processing as an input image, and utilize an iteratively-updated gamma value, to perform iterative contrast enhancement processing: perform, according to a gamma value subjected to a $j^{th}$ iterative update, gamma transformation on the input image on which the contrast enhancement processing is to be performed, to obtain a contrast-enhanced image of a $j^{th}$ iteration, j being an integer greater than or equal to 1: replace, when it is determined that a contrast difference between the contrast-enhanced image of the $j^{th}$ iteration and the input image on which the contrast enhancement processing is to be performed is greater than a contrast threshold, a contrast of the input image on which the contrast enhancement processing is to be performed with that of the contrast-enhanced image of the $j^{th}$ iteration, update a gamma value of the $j^{th}$ iteration, to obtain a gamma value of a $(j+1)^{th}$ iteration, and utilize the gamma value of the $(j+1)^{th}$ iteration, to continue to perform iterative contrast enhancement processing on the input image on which the contrast enhancement processing is to be performed until it is determined that a contrast difference between the contrast-enhanced image of the $j^{th}$ iteration and an input image on which the contrast enhancement processing is to be performed is less than or equal to the contrast threshold; and use a contrast-enhanced image of a last iteration as an input image on which the detail enhancement processing is to be performed.

In an implementation, the gamma value of the $j^{th}$ iteration is utilized, to perform gamma transformation on the original image, to obtain the contrast-enhanced image of the $j^{th}$ iteration. It should be noted that a first gamma value is preset, and different gamma values are used when performing gamma transformation on the original image for different numbers of iterations, that is, by continuously updating the gamma values, the original image is continuously subjected to gamma transformation of different gamma values, so that a contrast of the transformed image may be similar with that of the original image.

The contrast is used for representing a stretching contrast between light and dark, and generally represents the definition of the image quality. In the present embodiment, contrasts of the original image and the image subjected to the gamma transformation may be calculated through the following formula (1):

$$C=\Sigma_\delta \delta(i,j)^2 P_\delta(i,j) \qquad \text{formula (1)}.$$

Wherein, $\delta(i,j)=|i-j|$ represents a gray difference between a pixel i and a neighboring pixels j, and $P_\delta(i,j)$ represents a probability that the pixel difference is $\delta$.

4 neighboring (up, down, left, and right) pixels or 8 neighboring (up, down, left, right, an upper left corner, an upper right corner, a lower left corner, and a lower right corner) pixels may be selected as the neighboring pixels.

Determine the contrast difference between the contrast-enhanced image of the $j^{th}$ iteration and the input image on which the contrast enhancement processing is to be performed, replace, when the contrast difference is greater than the contrast threshold, the contrast of the input image with that of the contrast-enhanced image of the $j^{th}$ iteration, update the gamma value of the $j^{th}$ iteration, to obtain the gamma value of the $(j+1)^{th}$ iteration, to continue to perform gamma transformation on the original image until it is determined that a contrast difference is less than or equal to the contrast threshold; and use a contrast-enhanced image of a last iteration as an input image on which the detail enhancement processing is to be performed.

In an implementation, an iterative process is to update the gamma value and utilize the updated gamma value, to perform the gamma transformation. In addition, the contrast of the input image is also continuously updated along with an update of the gamma value. After each transformation, the contrast of the input image is replaced with a contrast of a transformed image, then whether a contrast difference between an image obtained after a previous transformation and a contrast obtained after a present transformation is greater than the threshold is continuously calculated, and if not, it is indicated that the contrast is increased slightly, and the iteration may be stopped. The contrast-enhanced image of the last iteration is output.

It should be noted that a plurality of contrast enhancement solutions are provided, including logarithmic transformation, power-law transformation, histogram equalization, etc. In the present embodiment, the power-law transformation is selected for contrast enhancement in consideration of controllability and adjustability of the power-law transformation. The power-law transformation is also called gamma transformation, which is to perform a power function operation on each pixel, as shown in formula (2).

$$s=cr^\gamma \qquad \text{formula (2).}$$

Wherein c and γ (that is, gamma) are constants, r represents a pixel value, and s represents a pixel value after gamma transformation.

When γ<1, brightness of the image may be increased, thereby reducing the contrast of the image. When γ>1, the brightness of the image may be reduced, the image becomes dark, but the contrast is enhanced. Therefore, to appropriately increase the contrast of the image, a value of γ greater than 1 should be used.

It should be noted that in order to ensure that the colors of the original image are not changed during gamma transformation, the input image may be transformed into the HSV image, and the V channel image of the HSV image is subjected to the gamma transformation. In a specific implementation, when it is determined that the reconstructed image subjected to the super-resolution processing is the RGB image, the reconstructed image is subjected to the HSV conversion, to obtain the HSV original image, and the V channel image of the HSV original image is used as the input image on which the contrast enhancement processing is to be performed. Alternatively, when it is determined that the original image not subjected to the super-resolution processing is the RGB image, the original image is subjected to the HSV conversion, to obtain the HSV original image, and the V channel image of the HSV original image is used as the input image on which the contrast enhancement processing is to be performed.

In an implementation, the V channel image may be subjected to the gamma transformation, a contrast of the V channel image may be calculated, whether an increase amplitude of the contrast is greater than the contrast threshold is judged, if yes, the value of gamma (γ) is increased for gamma transformation, the contrast is iteratively calculated, and an increase amplitude is judged again, to finally determine the value of γ.

It should be noted that the V channel image of the original image is subjected to the gamma transformation, and a finally-determined image subjected to the gamma transformation is also a V channel image. Therefore, the V channel image is also required to be converted into the RGB image.

In some embodiments, since the contrast of the original image subjected to the gamma transformation is increased, entire brightness of the image subjected to the gamma transformation will be reduced. In the present embodiment, after it is determined that the contrast difference is less than or equal to the contrast threshold, brightness is stretched firstly, and a brightness-stretched image is used as a finally-output image. In an implementation, the brightness is stretched in the following manner.

Determine a brightness mean difference between the original image and a contrast-enhanced image obtained after a last gamma transformation. If an input image is a V channel image, a brightness mean of the input image is a mean of all gray values in the V channel image. Similarly, if the input image is the V channel image, the contrast-enhanced image obtained after the last gamma transformation is also a V channel image, and a brightness mean of the contrast-enhanced image obtained after the last gamma transformation is also the mean of all the gray values.

Superpose the difference on brightness of the contrast-enhanced image obtained after the last gamma transformation, to obtain a superimposed image, where the brightness of the image is used as a brightness matrix, and the difference is superposed on the brightness of the contrast-enhanced image obtained through the gamma transformation, that is, the difference is superposed on the brightness matrix, to obtain the superposed image.

Replace the contrast-enhanced image obtained through the last gamma transformation with the superimposed image, where the superimposed image may be regarded as the brightness-stretched image. The brightness of the image may be stabilized by superposing the difference of the brightness mean and extending a brightness range. It should be noted that after the brightness is stretched, since a value range of each pixel is highly possible to be outside a standard range (such as 0-255) in this case, a value of each pixel may also be mapped to the standard range, and finally the superimposed image is obtained.

In an implementation, integral brightness of the image may be kept unchanged by superimposing the brightness, and the definition of the image may be effectively improved by enhancing the contrast. In the present solution, the brightness is kept on the basis of enhancing the contrast, so that a good enhancement effect may be achieved.

In some embodiments, if the input original image is the V channel image, the brightness-stretched image, that is, the superimposed image, is also a V channel image. Therefore, the superimposed image is required to be converted into an RGB image before being output.

Figure 6:
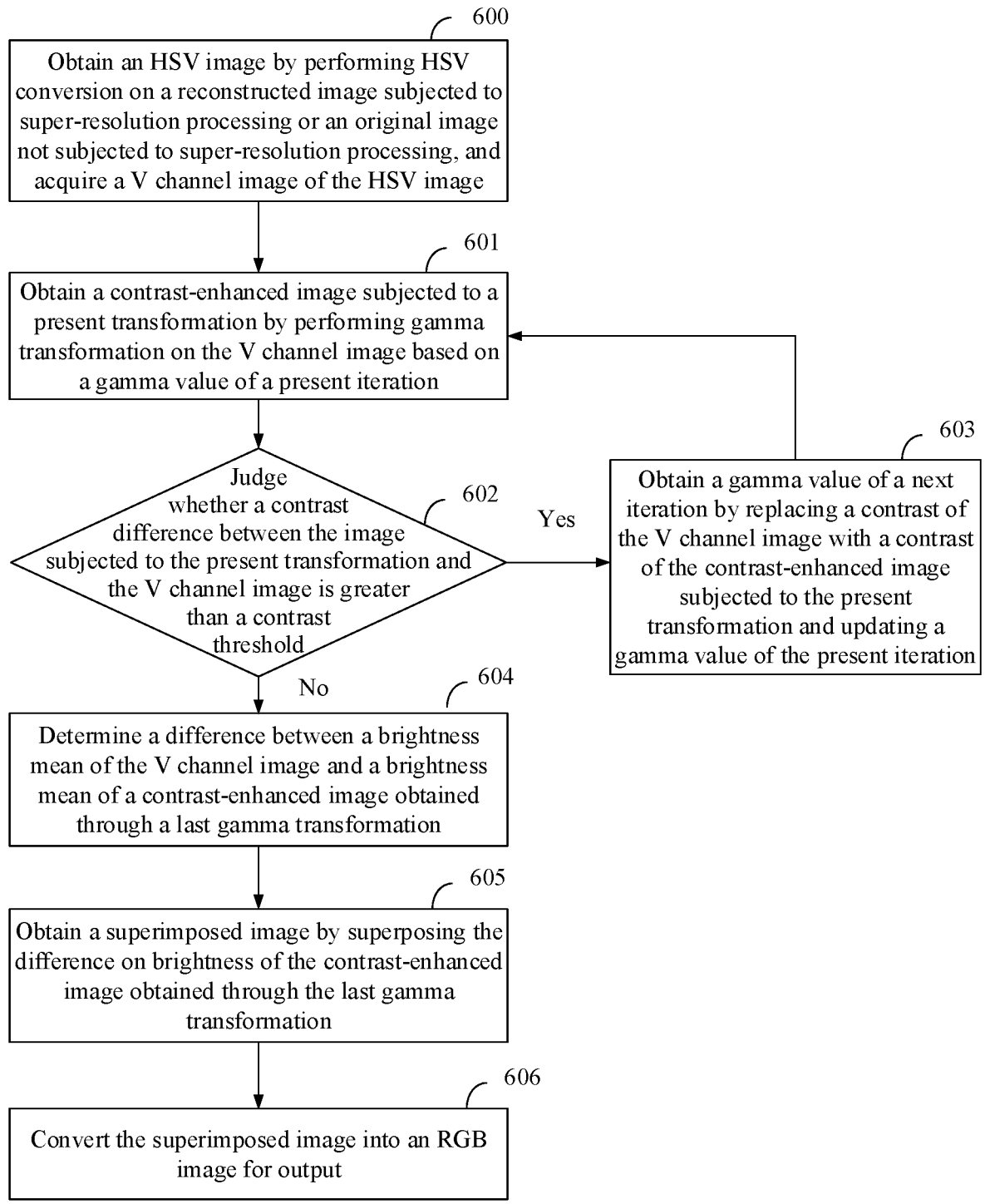
FIG. 6 is an implementation flow chart of a contrast enhancement processing method provided in an embodiment of the present disclosure.

As shown in FIG. 6, the present embodiment provides a contrast enhancement processing method. A specific implementation flow of the method is as follows.

Step 600, obtain an HSV image by performing HSV conversion on a reconstructed image subjected to super-resolution processing or an original image not subjected to super-resolution processing, and acquire a V channel image of the HSV image.

Step 601, obtain a contrast-enhanced image subjected to a present transformation by performing gamma transformation on the V channel image based on a gamma value of a present iteration.

The present iteration refers to a $j^{th}$ iteration.

Step 602, judge whether a contrast difference between an image subjected to the present transformation and the V channel image is greater than a contrast threshold, and if yes, execute step 603, otherwise execute step 604.

Step 603: obtain a gamma value of a next iteration by replacing a contrast of the V channel image with a contrast of a contrast-enhanced image after the present transformation and updating a gamma value of the present iteration, and return to step 601.

In an implementation, manners of updating the gamma value include increasing the gamma value by superimposing a set step length, or decreasing the gamma value by subtracting the set step length, which may be determined according to actual requirements and are not limited excessively in the present embodiment.

Step 604: determine a difference between a brightness mean of the V channel image and a brightness mean of a contrast-enhanced image obtained through a last gamma transformation.

Step 605: obtain a superimposed image by superposing the difference on brightness of the contrast-enhanced image obtained through the last gamma transformation.

Step 606: convert the superimposed image into an RGB image for output.

Figure 7:
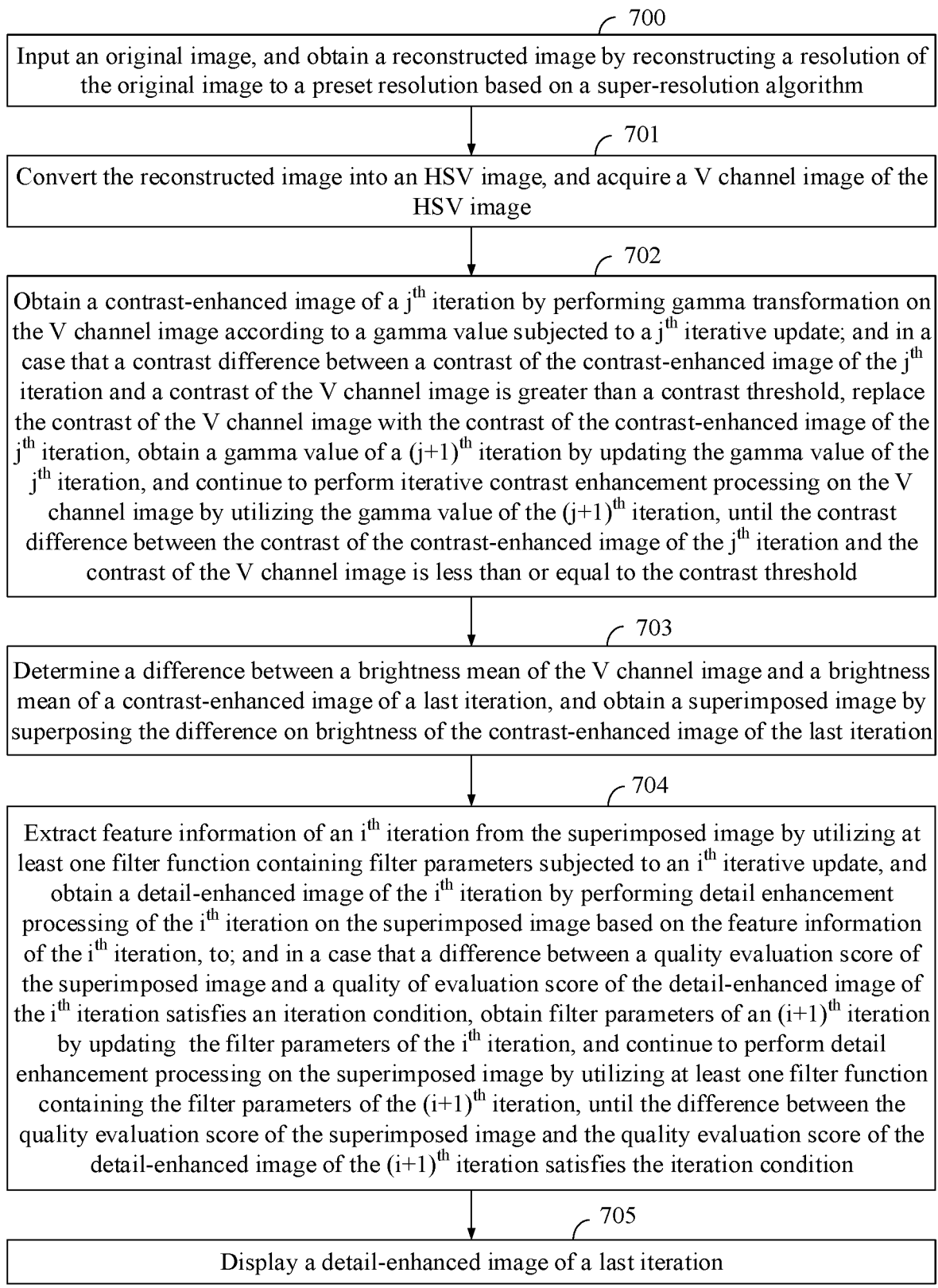
FIG. 7 is a specific implementation flow chart containing three enhancement processing methods provided in an embodiment of the present disclosure.

In order to completely describe the above three enhancement processing methods provided in the present embodiment, the present embodiment provides a processing flow of enhancing an image quality, which is merely exemplarily used for describing a specific flow including the three enhancement processing methods. As shown in FIG. 7, a specific implementation of the flow is as follows.

Step 700, input an original image, and obtain a reconstructed image by reconstructing a resolution of the original image to a preset resolution based on a super-resolution algorithm.

Step 701, convert the reconstructed image into an HSV image, and acquire a V channel image of the HSV image.

Step 702, obtain a contrast-enhanced image of a $j^{th}$ iteration by performing gamma transformation, on the V channel image according to a gamma value subjected to a $j^{th}$ iterative update: in a case that a contrast difference between a contrast of the contrast-enhanced image of the $j^{th}$ iteration and a contrast of the V channel image is greater than a contrast threshold, replace the contrast of the V channel image with the contrast of the contrast-enhanced image of the $j^{th}$ iteration, obtain a gamma value of a $(j+1)^{th}$ iteration by updating the gamma value of the $j^{th}$ iteration, and continue to perform iterative contrast enhancement processing on the V channel image by utilizing the gamma value of the $(j+1)^{th}$ iteration, until it is determined that the contrast difference between the contrast of the contrast-enhanced image of the $j^{th}$ iteration and the contrast of the V channel image is less than or equal to the contrast threshold, j being an integer greater than or equal to 1.

Step 703, determine a difference between a brightness mean of the V channel image and a brightness mean of a contrast-enhanced image of a last iteration, and obtain a superimposed image by superposing the difference on brightness of the contrast-enhanced image of the last iteration.

Step 704, extract feature information of an $i^{th}$ iteration from the superimposed image by utilizing at least one filter function containing filter parameters subjected to an $i^{th}$ iterative update, and obtain a detail-enhanced image of the $i^{th}$ iteration by performing detail enhancement processing of the $i^{th}$ iteration on the superimposed image based on the feature information of the $i^{th}$ iteration; in a case that a difference between a quality evaluation score of the superimposed image and a quality evaluation score of the detail-enhanced image of the $i^{th}$ iteration satisfies an iteration condition, obtain filter parameters of an $(i+1)^{th}$ iteration by updating the filter parameters of the $i^{th}$ iteration, and continue to perform detail enhancement processing on the superimposed image by utilizing at least one filter function containing the filter parameters of the $(i+1)^{th}$ iteration, until the difference between the quality evaluation score of the superimposed image and the quality evaluation score of the detail-enhanced image of the $(i+1)^{th}$ iteration satisfies the iteration condition, i being an integer greater than or equal to 1.

Step 705, display a detail-enhanced image of a last iteration.

To sum up, the embodiment of the present disclosure provides the three enhancement processing methods, that is. 1, the detail enhancement processing, in which the edge feature information and the high-frequency information of the original image are utilized, to enhance details of the input image: 2, the super-resolution reconstruction processing (that is, the super-resolution processing), in which the super-resolution reconstruction algorithm is utilized to reconstruct the super-resolution of the input image; and 3, the contrast enhancement processing, in which the gamma transformation is utilized to enhance the contrast of the input image. In a specific implementation, the above three enhancement processing manners may be implemented independently or in combination, which is not limited excessively in the present embodiment.

In a combined implementation, an implementation order of the above three enhancement processing methods may be defined as required, which is not limited excessively in the present embodiment. In some embodiments, the original image is subjected to the super-resolution processing first, to obtain the reconstructed image, then the V channel image of the HSV reconstructed image is subjected to the iterative contrast enhancement processing, to obtain the RGB superimposed image, and finally the V channel image of the HSV superimposed image is subjected to the iterative detail enhancement processing, to obtain the RGB detail-enhanced image. In some embodiments, the V channel image of the HSV original image is subjected to the iterative contrast enhancement processing first, to obtain the RGB superimposed image, then the RGB superimposed image is subjected to the super-resolution reconstruction processing (the super-resolution processing), to obtain the reconstructed image, and finally the V channel image of the HSV reconstructed image is subjected to the iterative detail enhancement processing, to obtain the RGB detail-enhanced image.

Based on the same inventive concept, an embodiment of the present disclosure further provides a method for adaptively enhancing an image quality. Since the method is the one used by the display device in the embodiment of the present disclosure, and the principle of solving the problem through the method is similar to that of the display device, reference may be made to an implementation of the display device for an implementation of the method, which will not be described in detail.

Figure 8:
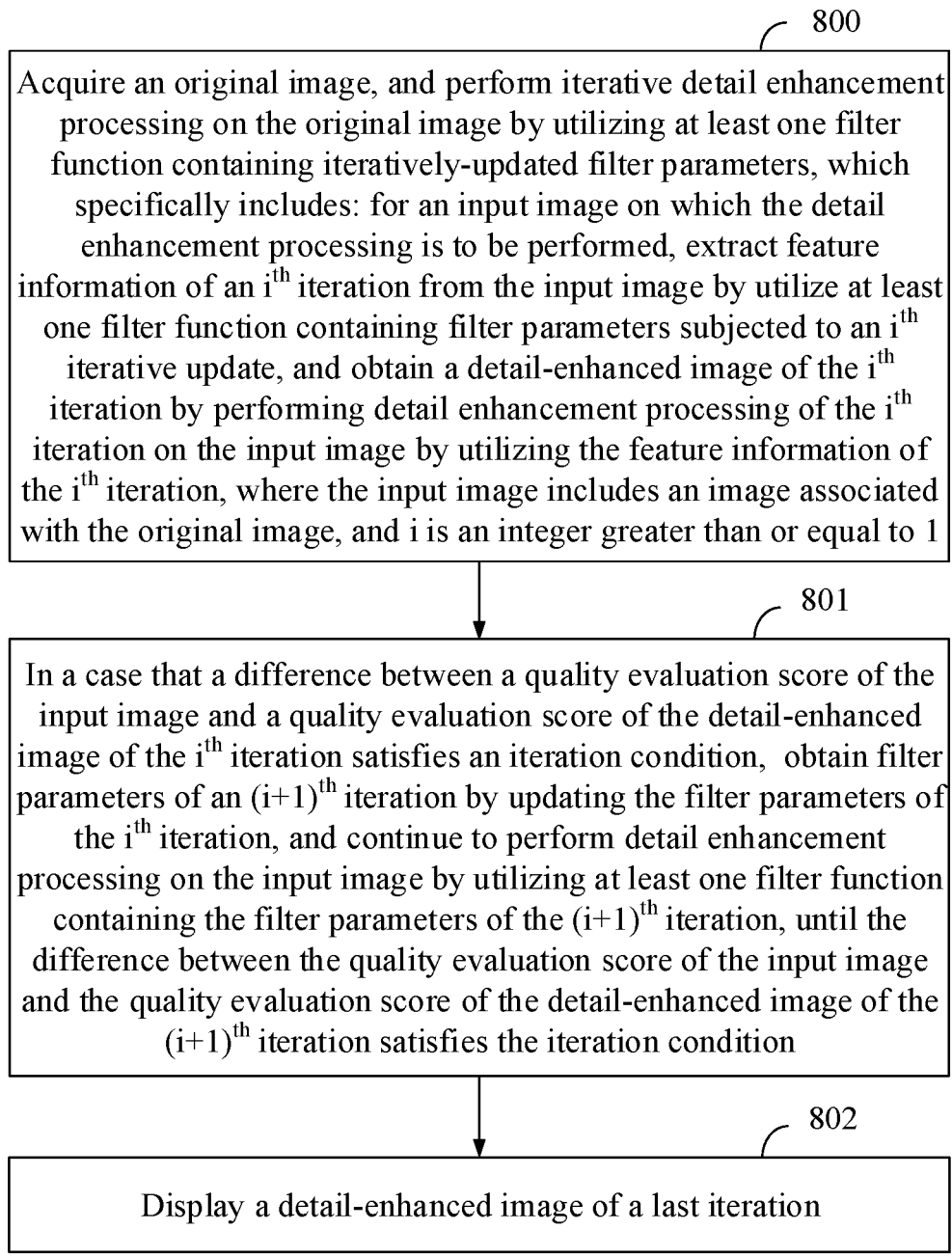
FIG. 8 is an implementation flow chart of a method for adaptively enhancing an image quality provided in an embodiment of the present disclosure.

As shown in FIG. 8, the present embodiment further provides a method for adaptively enhancing an image quality. A specific implementation flow of the method is as follows.

Step 800, acquire an original image, and perform iterative detail enhancement processing on the original image by utilizing at least one filter function containing iteratively-updated filter parameters, which specifically includes: for an input image on which the detail enhancement processing is to be performed, extract feature information of an $i^{th}$ iteration from the input image by utilizing at least one filter function containing filter parameters subjected to an $i^{th}$ iterative update, and obtain a detail-enhanced image of the $i^{th}$ iteration by performing detail enhancement processing of the $i^{th}$ iteration on the input image by utilizing the feature information of the $i^{th}$ iteration, where the input image includes an image associated with the original image, and i is an integer greater than or equal to 1.

In an implementation, the input original image is enhanced by utilizing all present feature information, to obtain an image subjected to present enhancement processing, where all the feature information is determined according to all the present filter parameters, and all the filter parameters are used for representing a size of a filter window used when extracting the feature information from the original image.

Step 801. In a case that a difference between a quality evaluation score of the input image and a quality evaluation score of the detail-enhanced image of the $i^{th}$ iteration satisfies an iteration condition, obtain filter parameters of an $(i+1)^{th}$ iteration by updating the filter parameters of the $i^{th}$ iteration, and continue to perform detail enhancement processing on the input image by utilizing at least one filter function containing the filter parameters of the $(i+1)^{th}$ iteration, until the difference between the quality evaluation score of the input image and the quality evaluation score of the detail-enhanced image of the $(i+1)^{th}$ iteration satisfies the iteration condition.

Step 802, display a detail-enhanced image of a last iteration.

As a possible implementation, after the step of acquiring an original image, and before the step of utilizing at least one filter function containing iteratively-updated filter parameters, to perform iterative detail enhancement processing on the original image, specifically, the method further includes: perform, when it is determined that the original image is an RGB image, HSV conversion on a color channel of the RGB original image, to obtain an HSV original image; and use a V channel image of the HSV original image as the input image on which the detail enhancement processing is to be performed.

As a possible implementation, before the step of displaying a detail-enhanced image of a last iteration, specifically, the method further includes: convert the detail-enhanced image of the last iteration into an RGB detail-enhanced image.

The displaying a detail-enhanced image of a last iteration specifically includes: display the RGB detail-enhanced image.

As a possible implementation, the step of utilizing at least one filter function containing iteratively-updated filter parameters, to extract feature information of an $i^{th}$ iteration from the original image, and utilizing the feature information of the $i^{th}$ iteration, to perform detail enhancement processing of the $i^{th}$ iteration on the original image, to obtain a detail-enhanced image of the $i^{th}$ iteration specifically includes: utilize a first filter function containing first filter parameters subjected to an $i^{th}$ iterative update, to extract first feature information of the $i^{th}$ iteration from the original image, and utilize the first feature information of the $i^{th}$ iteration, to perform detail enhancement processing of the $i^{th}$ iteration on the original image, so as to obtain a first enhanced image of the $i^{th}$ iteration; and utilize a second filter function containing second filter parameters subjected to an $i^{th}$ iterative update, to extract second feature information of the $i^{th}$ iteration from the first enhanced image, and utilize the second feature information of the $i^{th}$ iteration, to perform detail enhancement processing of the $i^{th}$ iteration on the first enhanced image, so as to obtain the detail-enhanced image of the $i^{th}$ iteration.

As a possible implementation, the step of utilizing the first feature information of the $i^{th}$ iteration, to perform detail enhancement processing of the $i^{th}$ iteration on the original image, to obtain a first enhanced image of the $i^{th}$ iteration specifically includes: superimpose the first feature information of the $i^{th}$ iteration on the original image, to obtain the first enhanced image of the $i^{th}$ iteration.

The step of utilizing the second feature information of the $i^{th}$ iteration, to perform detail enhancement processing of the $i^{th}$ iteration on the first enhanced image includes: superpose the second feature information of the $i^{th}$ iteration on the first enhanced image of the $i^{th}$ iteration, to obtain the detail-enhanced image of the $i^{th}$ iteration.

As a possible implementation, the step of utilizing a first filter function containing first filter parameters subjected to an $i^{th}$ iterative update, to extract first feature information of the $i^{th}$ iteration from the original image includes: utilize a first filter function containing first filter parameters subjected to an $i^{th}$ iterative update, to filter the original image, so as to obtain a first filtered image of the $i^{th}$ iteration, and subtract the first filtered image of the $i^{th}$ iteration from the original image, to obtain first feature information of the $i^{th}$ iteration.

The step of utilizing a second filter function containing second filter parameters subjected to an $i^{th}$ iterative update, to extract second feature information of the $i^{th}$ iteration from the first enhanced image includes: utilize a second filter function containing second filter parameters subjected to an $i^{th}$ iterative update, to filter the first enhanced image of the $i^{th}$ iteration, so as to obtain a second filtered image of the $i^{th}$ iteration, and subtract the second filtered image of the $i^{th}$ iteration from the first enhanced image of the $i^{th}$ iteration, to obtain second feature information of the $i^{th}$ iteration.

As a possible implementation, the first filter function is a guided filter function, and the second filter function is a Gaussian filter function; and alternatively, the first filter function is a Gaussian filter function, and the second filter function is a guided filter function.

As a possible implementation, a quality evaluation score of the original image is a first NIQE score obtained by evaluating, based on a NIQE algorithm, a quality of the original image: and a quality evaluation score of the detail-enhanced image of the $i^{th}$ iteration is a second NIQE score obtained by evaluating, based on the NIQE algorithm, a quality of the detail-enhanced image of the $i^{th}$ iteration.

As a possible implementation, the step of determining that a difference between quality evaluation scores of the original image and the detail-enhanced image of the $i^{th}$ iteration satisfies an iteration condition includes: determine that a difference between the first NIQE score and the second NIQE score is less than or equal to 0) or greater than or equal to a preset threshold.

As a possible implementation, after the step of acquiring an original image, and before the step of utilizing at least one filter function containing iteratively-updated filter parameters, to perform iterative detail enhancement processing on the original image, specifically, the method further includes: reconstruct, based on a super-resolution algorithm, a resolution of an input image subjected to super-resolution processing to a preset resolution, to obtain a reconstructed image, the preset resolution being higher than a resolution of the original image, the input image subjected to the super-resolution processing being the original image or a contrast-enhanced image, and the contrast-enhanced image being obtained by performing contrast enhancement processing on the original image; and use the reconstructed image as the input image on which the detail enhancement processing is to be performed.

As a possible implementation, the step of reconstructing, based on a super-resolution algorithm, a resolution of the original image to a preset resolution includes: determine, according to a size of the original image, a super-resolution rate factor corresponding to the size; and reconstruct, according to the super-resolution rate factor and the super-resolution algorithm, the resolution of the original image to the preset resolution.

As a possible implementation, after the step of acquiring an original image, and before the step of utilizing at least one filter function containing iteratively-updated filter parameters, to perform iterative detail enhancement processing on the original image, specifically, the method further includes: use the reconstructed image subjected to super-resolution processing or the original image not subjected to super-resolution processing as an input image, and utilize an iteratively-updated gamma value, to perform iterative contrast enhancement processing: perform, according to a gamma value subjected to a $j^{th}$ iterative update, gamma transformation on the input image on which the contrast enhancement processing is to be performed, to obtain a contrast-enhanced image of a $j^{th}$ iteration, j being an integer greater than or equal to 1: replace, when it is determined that a contrast difference between the contrast-enhanced image of the $j^{th}$ iteration and the input image on which the contrast enhancement processing is to be performed is greater than a contrast threshold, a contrast of the input image on which the contrast enhancement processing is to be performed with that of the contrast-enhanced image of the $j^{th}$ iteration, update the gamma value of the $j^{th}$ iteration, to obtain a gamma value of a $(j+1)^{th}$ iteration, and utilize the gamma value of the $(j+1)^{th}$ iteration, to continue to perform iterative contrast enhancement processing on the input image on which the contrast enhancement processing is to be performed until it is determined that a contrast difference between the contrast-enhanced image of the $j^{th}$ iteration and an input image on which the contrast enhancement processing is to be performed is less than or equal to the contrast threshold; and use a contrast-enhanced image of a last iteration as an input image on which the detail enhancement processing is to be performed.

As a possible implementation, before the step of using a contrast-enhanced image of a last iteration as the input image on which the detail enhancement processing is to be performed, the method further includes: determine a brightness mean difference between the input image on which the contrast enhancement processing is to be performed and the contrast-enhanced image of the last iteration: superpose the difference on brightness of the contrast-enhanced image of the last iteration, to obtain a superimposed image; and use the superimposed image as the input image on which the detail enhancement processing is to be performed.

As a possible implementation, before utilizing an iteratively-updated gamma value to perform iterative contrast enhancement processing, the method further includes: perform, when it is determined that the reconstructed image subjected to super-resolution processing is an RGB image. HSV conversion on the reconstructed image, to obtain an HSV original image, and use a V channel image of the HSV original image as the input image on which the contrast enhancement processing is to be performed; and alternatively, perform, when it is determined that the original image not subjected to super-resolution processing is an RGB image. HSV conversion on the original image, to obtain an HSV original image, and use a V channel image of the HSV original image as the input image on which the contrast enhancement processing is to be performed.

As a possible implementation, before using the superimposed image as the input image on which the detail enhancement processing is to be performed, the method further includes: convert the superimposed image into an RGB superimposed image.

Based on the same inventive concept, an embodiment of the present disclosure further provides an apparatus for adaptively enhancing an image quality. Since the apparatus corresponds to the method in the embodiment of the present disclosure, and the principle of solving the problem by the apparatus is similar to that of the method, reference may be made to the implementation of the method for an implementation of the apparatus, which will not be described in detail.

Figure 9:
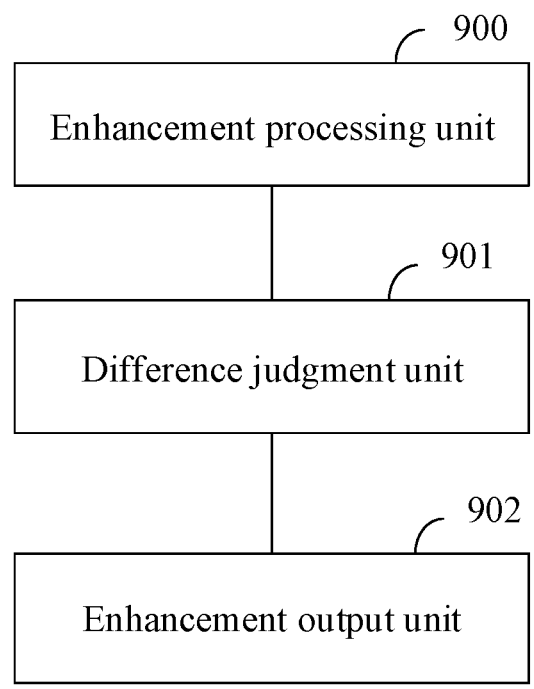
FIG. 9 is a schematic diagram of an apparatus for adaptively enhancing an image quality provided in an embodiment of the present disclosure.

As shown in FIG. 9, the apparatus includes: an enhancement processing unit 900 used for acquiring an original image, and utilizing at least one filter function containing iteratively-updated filter parameters, to perform iterative detail enhancement processing on the original image, which specifically includes: for an input image on which the detail enhancement processing is to be performed, utilize at least one filter function containing filter parameters subjected to an $i^{th}$ iterative update, to extract feature information of an $i^{th}$ iteration from the original image, and utilize the feature information of the $i^{th}$ iteration, to perform detail enhancement processing of the $i^{th}$ iteration on the original image, to obtain a detail-enhanced image of the $i^{th}$ iteration, i being an integer greater than or equal to 1: a difference judgment unit 901 used for updating, when it is determined that a difference between quality evaluation scores of the original image and the detail-enhanced image of the $i^{th}$ iteration satisfies an iteration condition, the filter parameters of the $i^{th}$ iteration, to obtain filter parameters of an $(i+1)^{th}$ iteration, and utilizing at least one filter function containing the filter parameters of the $(i+1)^{th}$ iteration, to continue to perform detail enhancement processing on the detail-enhanced image of the $i^{th}$ iteration until a difference between quality evaluation scores of the original image and a detail-enhanced image of the $(i+1)^{th}$ iteration satisfies the iteration condition; and an enhancement output unit 902 used for displaying a detail-enhanced image of a last iteration.

As a possible implementation, before the step of displaying a detail-enhanced image of a last iteration, the apparatus further includes a conversion unit specifically used for: converting the detail-enhanced image of the last iteration into an RGB detail-enhanced image.

Specifically, the enhancement output unit 902 is further used for: displaying the RGB detail-enhanced image.

As a possible implementation, specifically, the enhancement processing unit 900 is used for: utilizing a first filter function containing first filter parameters subjected to an $i^{th}$ iterative update, to extract first feature information of the $i^{th}$ iteration from the original image, and utilizing the first feature information of the $i^{th}$ iteration, to perform detail enhancement processing of the $i^{th}$ iteration on the original image, so as to obtain a first enhanced image of the $i^{th}$ iteration; and utilizing a second filter function containing second filter parameters subjected to an $i^{th}$ iterative update, to extract second feature information of the $i^{th}$ iteration from the first enhanced image, and utilizing the second feature information of the $i^{th}$ iteration, to perform detail enhancement processing of the $i^{th}$ iteration on the first enhanced image, so as to obtain the detail-enhanced image of the $i^{th}$ iteration.

As a possible implementation, specifically, the enhancement processing unit 900 is used for: superimposing the first feature information of the $i^{th}$ iteration on the original image, to obtain the first enhanced image of the $i^{th}$ iteration; and superposing the second feature information of the $i^{th}$ iteration on the first enhanced image of the $i^{th}$ iteration, to obtain the detail-enhanced image of the $i^{th}$ iteration.

As a possible implementation, specifically, the enhancement processing unit 900 is used for: utilizing a first filter function containing first filter parameters subjected to an $i^{th}$ iterative update, to filter the original image, so as to obtain a first filtered image of the $i^{th}$ iteration, and subtracting the first filtered image of the $i^{th}$ iteration from the original image, to obtain the first feature information of the $i^{th}$ iteration; and utilizing a second filter function containing second filter parameters subjected to an $i^{th}$ iterative update, to filter the first enhanced image of the $i^{th}$ iteration, so as to obtain a second filtered image of the $i^{th}$ iteration, and subtracting the second filtered image of the $i^{th}$ iteration from the first enhanced image of the $i^{th}$ iteration, to obtain the second feature information of the $i^{th}$ iteration.

As a possible implementation, the first filter function is a guided filter function, and the second filter function is a Gaussian filter function; and alternatively, the first filter function is a Gaussian filter function, and the second filter function is a guided filter function.

As a possible implementation, a quality evaluation score of the original image is a first NIQE score obtained by evaluating, based on a NIQE algorithm, a quality of the original image; and a quality evaluation score of the detail-enhanced image of the $i^{th}$ iteration is a second NIQE score obtained by evaluating, based on the NIQE algorithm, a quality of the detail-enhanced image of the $i^{th}$ iteration.

As a possible implementation, specifically: the difference judgment unit 901 is used for: determining that a difference between the first NIQE score and the second NIQE score is less than or equal to 0) or greater than or equal to a preset threshold.

As a possible implementation, after the step of acquiring an original image, and before the step of utilizing at least one filter function containing iteratively-updated filter parameters, to perform iterative detail enhancement processing on the original image, the apparatus further includes a reconstruction unit specifically used for: reconstructing, based on a super-resolution algorithm, a resolution of the input image subjected to super-resolution processing to a preset resolution, to obtain a reconstructed image, the preset resolution being higher than a resolution of the original image, the input image subjected to the super-resolution processing being the original image or a contrast-enhanced image, and the contrast-enhanced image being obtained by performing contrast enhancement processing on the original image; and using the reconstructed image as the input image on which the detail enhancement processing is to be performed.

As a possible implementation, specifically, the reconstruction unit is used for: determining, according to a size of the original image, a super-resolution rate factor corresponding to the size; and reconstructing, according to the super-resolution rate factor and the super-resolution algorithm, the resolution of the original image to the preset resolution.

As a possible implementation, after the step of acquiring an original image, and before the utilizing at least one filter function containing iteratively-updated filter parameters, to perform iterative detail enhancement processing on the original image, specifically, the apparatus further includes a contract enhancement unit specifically used for: using the reconstructed image subjected to super-resolution processing or the original image not subjected to super-resolution processing as an input image, and utilizing an iteratively-updated gamma value, to perform iterative contrast enhancement processing: performing, according to a gamma value subjected to a $j^{th}$ iterative update, gamma transformation on the input image on which the contrast enhancement processing is to be performed, to obtain a contrast-enhanced image of a $j^{th}$ iteration, j being an integer greater than or equal to 1: replacing, when it is determined that a contrast difference between the contrast-enhanced image of the $j^{th}$ iteration and the input image on which the contrast enhancement processing is to be performed is greater than a contrast threshold, a contrast of the input image on which the contrast enhancement processing is to be performed with that of the contrast-enhanced image of the $j^{th}$ iteration, updating the gamma value of the $j^{th}$ iteration, to obtain a gamma value of a $(j+1)^{th}$ iteration, and utilizing the gamma value of the $(j+1)^{th}$ iteration, to continue to perform iterative contrast enhancement processing on the input image on which the contrast enhancement processing is to be performed until it is determined that a contrast difference between the contrast-enhanced image of the $j^{th}$ iteration and an input image on which the contrast enhancement processing is to be performed is less than or equal to the contrast threshold; and using a contrast-enhanced image of a last iteration as an input image on which the detail enhancement processing is to be performed.

As a possible implementation, before the step of using a contrast-enhanced image of a last iteration as an input image on which the detail enhancement processing is to be performed, specifically, the contract enhancement unit is further used for: determining a brightness mean difference between the input image on which the contrast enhancement processing is to be performed and the contrast-enhanced image of the last iteration: superposing the difference on brightness of the contrast-enhanced image of the last iteration, to obtain a superimposed image; and using the superimposed image as the input image on which the detail enhancement processing is to be performed.

As a possible implementation, before the step of utilizing an iteratively-updated gamma value, to perform iterative contrast enhancement processing, specifically, the contract enhancement unit is further used for: performing, when it is determined that the reconstructed image subjected to super-resolution processing is an RGB image, HSV conversion on the reconstructed image, to obtain an HSV original image, and using a V channel image of the HSV original image as the input image on which the contrast enhancement processing is to be performed; and alternatively, performing, when it is determined that the original image not subjected to super-resolution processing is an RGB image, HSV conversion on the original image, to obtain an HSV original image, and using a V channel image of the HSV original image as the input image on which the contrast enhancement processing is to be performed.

As a possible implementation, before the step of using the superimposed image as the input image on which the detail enhancement processing is to be performed, specifically, the contract enhancement unit is further used for: converting the superimposed image into an RGB superimposed image.

Based on the same inventive concept, an embodiment of the present disclosure further provides a non-transitory computer storage medium storing a computer program. When executed by a processor, the program is used for: acquiring an original image, and utilizing at least one filter function containing iteratively-updated filter parameters, to perform iterative detail enhancement processing on the original image, which specifically includes: for an input image on which the detail enhancement processing is to be performed, utilize at least one filter function containing filter parameters subjected to an $i^{th}$ iterative update, to extract feature information of an $i^{th}$ iteration from the input image, and utilize the feature information of the $i^{th}$ iteration, to perform detail enhancement processing of the $i^{th}$ iteration on the input image, so as to obtain a detail-enhanced image of the $i^{th}$ iteration, the input image including an image related to the original image, and i being an integer greater than or equal to 1: update, when it is determined that a difference between quality evaluation scores of the input image and the detail-enhanced image of the $i^{th}$ iteration satisfies an iteration condition, the filter parameters of the $i^{th}$ iteration, to obtain filter parameters of an $(i+1)^{th}$ iteration, and utilize at least one filter function containing the filter parameters of the $(i+1)^{th}$ iteration, to continue to perform detail enhancement processing on the input image until a difference between quality evaluation scores of the input image and a detail-enhanced image of the $(i+1)^{th}$ iteration satisfies the iteration condition; and display a detail-enhanced image of a last iteration.

Those skilled in the art should understand that the embodiments of the present disclosure may be provided as methods, systems, or computer program products. Therefore, the present disclosure may use full hardware embodiments, full software embodiments, or software and hardware combined embodiments. Moreover, the present disclosure may be in the form of a computer program product implemented on one or more computer-usable storage media (including, but not limited to, a disk memory, a compact disc read-only memory (CD-ROM), an optical memory, etc.) that contain computer-usable program codes.

The present disclosure is described with reference to flow charts and/or block diagrams of the method, the device (system), and the computer program product according to the embodiments of the present disclosure. It should be understood that each flow and/or block in the flow diagrams and/or block diagrams and combinations of the flows and/or blocks in the flow diagrams and/or block diagrams may be implemented through computer program instructions. These computer program instructions may be provided for a general-purpose computer, a special-purpose computer, an embedded processor, or a processor of another programmable data processing device, to generate a machine, so that the instructions executed by the computer or the processor of another programmable data processing device generate an apparatus for implementing a specific function in one or more flows in the flow charts and/or in one or more blocks in the block diagrams.

These computer program instructions may also be stored in a computer-readable memory that may guide the computer or another programmable data processing device to work in a specific manner, so that the instructions stored in the computer-readable memory generate a product including an instruction apparatus, and the instruction apparatus implements the specific function in one or more flows of the flow charts and/or one or more blocks in the block diagrams.

These computer program instructions may also be loaded onto the computer or another programmable data processing device, so that a series of operations and steps are executed on the computer or another programmable device, thereby generating computer-implemented processing. Therefore, the instructions executed on the computer or another programmable apparatus provide steps for implementing the specific function in one or more flows in the flow charts and/or in one or more blocks in the block diagrams.

Although the preferred embodiments of the present disclosure have been described, those skilled in the art may make additional changes and modifications to these embodiments once they learn the basic inventive concepts. Therefore, the appended claims are intended to be interpreted as including the preferred embodiments and all changes and modifications falling within the scope of the present disclosure.

Obviously, those skilled in the art may make various amendments and variations to the embodiments of the present disclosure, without departing from the spirit and scope of the embodiments of the present disclosure. In this way, it is intended that the present disclosure are also intended to include these amendments and variations if these amendments and variations to the present disclosure fall within the scope of the claims of the present disclosure and the equivalents thereof.

What is claimed is:

1. A display device system, comprising:
a memory storing computer-readable instructions; and
a processor configured to run the computer-readable instructions to execute:
acquiring an original image, and performing iterative detail enhancement processing on the original image by utilizing at least one filter function comprising iteratively-updated filter parameters, which specifically comprises:
for an input image on which the detail enhancement processing is to be performed, extracting feature information of an $i^{th}$ iteration from the input image by utilizing at least one filter function comprising filter parameters subjected to an $i^{th}$ iterative update, and obtaining a detail-enhanced image of the $i^{th}$ iteration by performing the detail enhancement processing of the $i^{th}$ iteration on the input image based on the feature information of the $i^{th}$ iteration, wherein the input image comprises an image associated with the original image, and i is an integer greater than or equal to 1; and
in a case that a difference between a quality evaluation score of the input image and a quality evaluation score of the detail-enhanced image of the $i^{th}$ iteration satisfies an iteration condition, obtaining filter parameters of an $(i+1)^{th}$ iteration by updating the filter parameters of the $i^{th}$ iteration, and continuing to perform the detail enhancement processing on the input image by utilizing at least one filter function comprising the filter parameters of the $(i+1)^{th}$ iteration, until a difference between the quality evaluation score of the input image and a quality evaluation score of a detail-enhanced image of the $(i+1)^{th}$ iteration does not satisfy the iteration condition; wherein
the display device system further comprises a display screen configured for displaying a detail-enhanced image of a last iteration;
wherein the processor is configured for:
extracting first feature information of the $i^{th}$ iteration from the original image by utilizing a first filter function comprising first filter parameters subjected to the $i^{th}$ iterative update, and obtaining a first enhanced image of the $i^{th}$ iteration by performing the detail enhancement processing of the $i^{th}$ iteration on the original image based on the first feature information of the $i^{th}$ iteration; and
extracting second feature information of the $i^{th}$ iteration from the first enhanced image by utilizing a second filter function comprising second filter parameters subjected to the $i^{th}$ iterative update, and obtaining the detail-enhanced image of the $i^{th}$ iteration by performing the detail enhancement processing of the $i^{th}$ iteration on the first enhanced image based on the second feature information of the $i^{th}$ iteration.

2. The display device system according to claim 1, wherein after the acquiring the original image, and before performing the iterative detail enhancement processing on the original image by utilizing the at least one filter function comprising iteratively-updated filter parameters, the processor is further configured for:
   in a case that the original image is a red-green-blue (RGB) image, obtaining a hue-saturation-value (HSV) original image by performing HSV conversion on a color channel of the RGB original image; and
   taking a value (V) channel image of the HSV original image as the input image on which the detail enhancement processing is to be performed.

3. The display device system according to claim 2, wherein before the displaying the detail-enhanced image of the last iteration, the processor is further configured for:
   converting the detail-enhanced image of the last iteration into an RGB detail-enhanced image; and
   the display screen is configured for:
   displaying the RGB detail-enhanced image.

4. The display device system according to claim 1, wherein the processor is configured for:
   obtaining the first enhanced image of the $i^{th}$ iteration by superimposing the first feature information of the $i^{th}$ iteration on the original image; and
   obtaining the detail-enhanced image of the $i^{th}$ iteration by superposing the second feature information of the $i^{th}$ iteration on the first enhanced image of the $i^{th}$ iteration.

5. The display device system according to claim 1, wherein a processor is configured for:
   obtaining a first filtered image of the $i^{th}$ iteration by filtering the original image by utilizing the first filter function comprising the first filter parameters subjected to the $i^{th}$ iterative update, and obtaining the first feature information of the $i^{th}$ iteration by subtracting the first filtered image of the $i^{th}$ iteration from the original image; and
   obtaining a second filtered image of the $i^{th}$ iteration by filtering the first enhanced image of the $i^{th}$ iteration by utilizing the second filter function comprising second filter parameters subjected to the $i^{th}$ iterative update, and obtaining the second feature information of the $i^{th}$ iteration by subtracting the second filtered image of the $i^{th}$ iteration from the first enhanced image of the $i^{th}$ iteration.

6. The display device system according to claim 1, wherein the first filter function is a guided filter function, and the second filter function is a Gaussian filter function; or,
   the first filter function is a Gaussian filter function, and the second filter function is a guided filter function.

7. The display device system according to claim 1, wherein a quality evaluation score of the original image is a first natural image quality evaluator (NIQE) score obtained by evaluating a quality of the original image based on an NIQE algorithm; and
   the quality evaluation score of the detail-enhanced image of the $i^{th}$ iteration is a second NIQE score obtained by evaluating a quality of the detail-enhanced image of the $i^{th}$ iteration based on the NIQE algorithm.

8. The display device system according to claim 7, wherein a processor is configured for:
   determining that a difference between the first NIQE score and the second NIQE score is less than or equal to 0, or greater than or equal to a preset threshold.

9. The display device system according to claim 1, wherein after the acquiring the original image, and before performing the iterative detail enhancement processing on the original image by utilizing the at least one filter function comprising iteratively-updated filter parameters, the processor is further configured for:
   obtaining a reconstructed image by reconstructing a resolution of the input image subjected to super-resolution processing to a preset resolution based on a super-resolution algorithm, wherein the preset resolution is greater than a resolution of the original image, the input image subjected to the super-resolution processing is the original image or a contrast-enhanced image, and the contrast-enhanced image is obtained by performing contrast enhancement processing on the original image; and
   taking the reconstructed image as the input image on which the detail enhancement processing is to be performed.

10. The display device system according to claim 9, wherein the processor is configured for:
    determining a super-resolution rate factor corresponding to a size of the original image according to the size of the original image; and
    reconstructing the resolution of the original image to the preset resolution according to the super-resolution rate factor and the super-resolution algorithm.

11. The display device system according to claim 1, wherein after the acquiring the original image, and before performing the iterative detail enhancement processing on the original image by utilizing the at least one filter function comprising iteratively-updated filter parameters, the processor is further configured for:
    taking a reconstructed image subjected to super-resolution processing or the original image not subjected to super-resolution processing as an input image, and performing iterative contrast enhancement processing by utilizing an iteratively-updated gamma value:
    obtaining a contrast-enhanced image of a $j^{th}$ iteration by performing gamma transformation on the input image on which the contrast enhancement processing is to be performed according to a gamma value subjected to a $j^{th}$ iterative update, wherein j is an integer greater than or equal to 1;
    in a case that a contrast difference between a contrast of the contrast-enhanced image of the $j^{th}$ iteration and a contrast of the input image on which the contrast enhancement processing is to be performed is greater than a contrast threshold, replacing the contrast of the input image on which the contrast enhancement processing is to be performed with the contrast of the contrast-enhanced image of the $j^{th}$ iteration, obtaining a gamma value of a $(j+1)^{th}$ iteration by updating the gamma value of the $j^{th}$ iteration, and continuing to perform the iterative contrast enhancement processing on the input image on which the contrast enhancement processing is to be performed by utilizing the gamma value of the $(j+1)^{th}$ iteration, until the contrast difference between the contrast of the contrast-enhanced image of the $j^{th}$ iteration and the contrast of the input image on which the contrast enhancement processing is to be performed is less than or equal to the contrast threshold; and
    taking a contrast-enhanced image of a last iteration as the input image on which the detail enhancement processing is to be performed.

12. The display device system according to claim 11, wherein before the taking the contrast-enhanced image of the last iteration as the input image on which the detail enhancement processing is to be performed, the processor is further configured for:

determining a difference between a brightness mean of the input image on which the contrast enhancement processing is to be performed and a brightness mean of the contrast-enhanced image of the last iteration;

obtaining a superimposed image by superposing the difference on brightness of the contrast-enhanced image of the last iteration; and taking the superimposed image as the input image on which the detail enhancement processing is to be performed.

13. The display device system according to claim 12, wherein before the performing the iterative contrast enhancement processing by utilizing the iteratively-updated gamma value, the processor is further configured for:

in a case that the reconstructed image subjected to the super-resolution processing is an RGB image, obtaining an HSV original image by performing HSV conversion on the reconstructed image, and taking a V channel image of the HSV original image as the input image on which the contrast enhancement processing is to be performed; and or in a case that the original image not subjected to the super-resolution processing is an RGB image, obtaining an HSV original image by performing HSV conversion on the original image, and taking a V channel image of the HSV original image as the input image on which the contrast enhancement processing is to be performed.

14. The display device system according to claim 13, wherein before the taking the superimposed image as the input image on which the detail enhancement processing is to be performed, the processor is further configured for:

converting the superimposed image into an RGB superimposed image.

15. A method for adaptively enhancing an image quality, comprising:

acquiring an original image, and performing iterative detail enhancement processing on the original image by utilizing at least one filter function comprising iteratively-updated filter parameters, which specifically comprises: for an input image on which the detail enhancement processing is to be performed, extracting feature information of an $i^{th}$ iteration from the input image by utilizing at least one filter function comprising filter parameters subjected to an $i^{th}$ iterative update, and obtaining a detail-enhanced image of the $i^{th}$ iteration by performing the detail enhancement processing of the $i^{th}$ iteration on the input image based on the feature information of the $i^{th}$ iteration, wherein the input image comprises an image associated with the original image, and i is an integer greater than or equal to 1;

in a case that a difference between a quality evaluation score of the input image and a quality evaluation score of the detail-enhanced image of the $i^{th}$ iteration satisfies an iteration condition, obtaining filter parameters of an $(i+1)^{th}$ iteration by updating the filter parameters of the $i^{th}$ iteration, and continuing to perform the detail enhancement processing on the input image by utilizing at least one filter function comprising the filter parameters of the $(i+1)^{th}$ iteration, until a difference between the quality evaluation score of the input image and a quality evaluation score of a detail-enhanced image of the $(i+1)^{th}$ iteration does not satisfy the iteration condition; and displaying a detail-enhanced image of a last iteration;

wherein the extracting the feature information of the $i^{th}$ iteration from the input image by utilizing the at least one filter function comprising filter parameters subjected to the $i^{th}$ iterative update, and obtaining the detail-enhanced image of the $i^{th}$ iteration by performing the detail enhancement processing of the $i^{th}$ iteration on the input image based on the feature information of the $i^{th}$ iteration further comprise:

extracting first feature information of the $i^{th}$ iteration from the original image by utilizing a first filter function comprising first filter parameters subjected to an $i^{th}$ iterative update, and obtaining a first enhanced image of the $i^{th}$ iteration by performing the detail enhancement processing of the $i^{th}$ iteration on the original image based on the first feature information of the $i^{th}$ iteration; and extracting second feature information of the $i^{th}$ iteration from the first enhanced image by utilizing a second filter function comprising second filter parameters subjected to the $i^{th}$ iterative update, and obtaining the detail-enhanced image of the $i^{th}$ iteration by performing the detail enhancement processing of the $i^{th}$ iteration on the first enhanced image based on the second feature information of the $i^{th}$ iteration.

16. The method according to claim 15, wherein after the acquiring the original image, and before performing the iterative detail enhancement processing on the original image by utilizing the at least one filter function comprising iteratively-updated filter parameters, the method further comprises:

obtaining a reconstructed image by reconstructing a resolution of the input image subjected to super-resolution processing to a preset resolution based on a super-resolution algorithm, wherein the preset resolution is greater than a resolution of the original image, the input image subjected to the super-resolution processing is the original image or a contrast-enhanced image, and the contrast-enhanced image is obtained by performing contrast enhancement processing on the original image; and taking the reconstructed image as the input image on which the detail enhancement processing is to be performed.

17. The method according to claim 15, wherein after the acquiring the original image, and before performing the iterative detail enhancement processing on the original image by utilizing the at least one filter function comprising iteratively-updated filter parameters, the method further comprises:

taking a reconstructed image subjected to super-resolution processing or the original image not subjected to super-resolution processing as an input image, and performing iterative contrast enhancement processing by utilizing an iteratively-updated gamma value:

obtaining a contrast-enhanced image of a $j^{th}$ iteration by performing gamma transformation on the input image on which the contrast enhancement processing is to be performed according to a gamma value subjected to a $j^{th}$ iterative update, wherein j is an integer greater than or equal to 1;

determining a contrast difference between a contrast of the contrast-enhanced image of the $j^{th}$ iteration and a contrast of the input image on which the contrast enhancement processing is to be performed is greater than a contrast threshold, replacing the contrast of the input image on which the contrast enhancement processing is to be performed with the contrast of the contrast-enhanced image of the $j^{th}$ iteration, obtaining a gamma value of a $(j+1)^{th}$ iteration by updating the gamma value of the $j^{th}$ iterative, and continuing to perform the iterative contrast enhancement processing on the input image on which the contrast enhancement processing is to be performed by utilizing the gamma value of the $(j+1)^{th}$ iteration, until the contrast difference between the contrast of the contrast-enhanced image of the $j^{th}$ iteration and the contrast of the input image on which the contrast enhancement processing is to be performed is less than or equal to the contrast threshold; and taking a contrast-enhanced image of a last iteration as the input image on which the detail enhancement processing is to be performed.

18. A non-transitory computer storage medium, storing computer programs, which are executed by a processor to perform:

acquiring an original image, and performing iterative detail enhancement processing on the original image by utilizing at least one filter function comprising iteratively-updated filter parameters, which specifically comprises: for an input image on which the detail enhancement processing is to be performed, extracting feature information of an $i^{th}$ iteration from the input image by utilizing at least one filter function comprising filter parameters subjected to an $i^{th}$ iterative update, and obtaining a detail-enhanced image of the $i^{th}$ iteration by performing the detail enhancement processing of the $i^{th}$ iteration on the input image based on the feature information of the $i^{th}$ iteration, wherein the input image comprises an image associated with the original image, and i is an integer greater than or equal to 1;

in a case that a difference between a quality evaluation score of the input image and a quality evaluation score of the detail-enhanced image of the $i^{th}$ iteration satisfies an iteration condition, obtaining filter parameters of an $(i+1)^{th}$ iteration by updating the filter parameters of the $i^{th}$ iteration, and continuing to perform the detail enhancement processing on the input image by utilizing at least one filter function comprising the filter parameters of the $(i+1)^{th}$ iteration, until a difference between the quality evaluation score of the input image and a quality evaluation score of a detail-enhanced image of the $(i+1)^{th}$ iteration does not satisfy the iteration condition; and displaying a detail-enhanced image of a last iteration;

wherein the computer programs are executed by the processor to further perform:

extracting first feature information of the $i^{th}$ iteration from the original image by utilizing a first filter function comprising first filter parameters subjected to the $i^{th}$ iterative update, and obtaining a first enhanced image of the $i^{th}$ iteration by performing the detail enhancement processing of the $i^{th}$ iteration on the original image based on the first feature information of the $i^{th}$ iteration; and extracting second feature information of the $i^{th}$ iteration from the first enhanced image by utilizing a second filter function comprising second filter parameters subjected to the $i^{th}$ iterative update, and obtaining the detail-enhanced image of the $i^{th}$ iteration by performing the detail enhancement processing of the $i^{th}$ iteration on the first enhanced image based on the second feature information of the $i^{th}$ iteration.

* * * * *